(12) United States Patent
Viengkham et al.

(10) Patent No.: US 11,769,099 B2
(45) Date of Patent: Sep. 26, 2023

(54) APPARATUSES, COMPUTER-IMPLEMENTED METHODS, AND COMPUTER PROGRAM PRODUCTS FOR IMPROVED MONITORED BUILDING ENVIRONMENT MONITORING AND SCORING

(71) Applicant: Honeywell International Inc., Charlotte, NC (US)

(72) Inventors: Manyphay Viengkham, Cumming, GA (US); Amanda Birkhead, Minneapolis, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/068,624

(22) Filed: Oct. 12, 2020

(65) Prior Publication Data
US 2021/0225528 A1   Jul. 22, 2021

Related U.S. Application Data

(63) Continuation-in-part of application No. 16/747,479, filed on Jan. 20, 2020, now abandoned.

(51) Int. Cl.
*G06Q 10/0639* (2023.01)
*G16Y 20/30* (2020.01)
(Continued)

(52) U.S. Cl.
CPC ....... *G06Q 10/06393* (2013.01); *G06Q 40/12* (2013.12); *G16Y 10/80* (2020.01);
(Continued)

(58) Field of Classification Search
CPC .. H04L 67/12; G06Q 10/06393; G06Q 40/12; G06Q 50/06; G16Y 10/80; G16Y 20/10; G16Y 20/30; G16Y 40/10; G16Y 40/20
See application file for complete search history.

(56) References Cited

U.S. PATENT DOCUMENTS 10,229,464 B2 *  3/2019  Yu ............................ G06Q 50/06
10,317,858 B2    6/2019  Ray et al.
(Continued)

FOREIGN PATENT DOCUMENTS

JP    2003-108646 A     4/2003
KR    10-1698224 B1     1/2017
(Continued)

OTHER PUBLICATIONS

Extended European search report dated May 27, 2021 for EP Application No. 21152631, 8 pages.
(Continued)

*Primary Examiner* — Jason D Recek
(74) *Attorney, Agent, or Firm* — Alston & Bird LLP

(57) ABSTRACT

The present disclosure provides embodiments for improved monitoring of building environments and scoring of various aspects associated therewith. An example apparatus includes at least one processor and at least one memory that are configured in execution to receive, via a plurality of environment monitoring sensors positioned in at least one monitored building environment, building monitoring data. The example apparatus is further configured to determine, for the at least one monitored building environment and based on the building monitoring data, a building operations score set corresponding to a building operations metric set. The example apparatus is further configured to determine, for the at least one monitored building environment, an overall building operational score based on the building operations score set.

20 Claims, 15 Drawing Sheets

(51) Int. Cl.
  *G16Y 40/20* (2020.01)
  *G16Y 40/10* (2020.01)
  *G16Y 10/80* (2020.01)
  *G06Q 40/12* (2023.01)
  *G16Y 20/10* (2020.01)
  *G06Q 50/06* (2012.01)

(52) U.S. Cl.
  CPC .............. *G16Y 20/10* (2020.01); *G16Y 20/30* (2020.01); *G16Y 40/10* (2020.01); *G16Y 40/20* (2020.01); *G06Q 50/06* (2013.01)

(56) References Cited

U.S. PATENT DOCUMENTS

| | | |
|---|---|---|
| 2010/0286937 A1 | 11/2010 | Hedley et al. |
| 2011/0060612 A1 | 3/2011 | Mercer et al. |
| 2011/0261049 A1 | 10/2011 | Cardno et al. |
| 2014/0142904 A1 | 5/2014 | Drees et al. |
| 2014/0207693 A1* | 7/2014 | Horst ................ G06Q 50/16 705/317 |
| 2015/0094989 A1 | 4/2015 | Collet et al. |
| 2015/0310720 A1 | 10/2015 | Gettings et al. |
| 2016/0210569 A1 | 7/2016 | Enck |
| 2018/0046173 A1 | 2/2018 | Ahmed |
| 2019/0172165 A1 | 6/2019 | Verteletskyi et al. |
| 2019/0339841 A1* | 11/2019 | Nanjappan .............. G06F 16/00 |
| 2020/0057827 A1 | 2/2020 | Eckenrode et al. |
| 2020/0349661 A1* | 11/2020 | Dutta .................... G06Q 50/163 |
| 2021/0225529 A1 | 7/2021 | Viengkham et al. |

FOREIGN PATENT DOCUMENTS

| | | |
|---|---|---|
| KR | 10-2008855 B1 | 10/2019 |
| WO | 2010/129913 A1 | 11/2010 |
| WO | 2015/013677 A2 | 1/2015 |
| WO | 2018/148732 A2 | 8/2018 |

OTHER PUBLICATIONS

Non-Final Office Action received for U.S. Appl. No. 17/121,528, dated Oct. 28, 2021, 13 pages.
English Translation of KR Office Action dated Aug. 30, 2021 for KR Application No. 10-2021-0006507.
KR Office Action dated Aug. 30, 2021 for KR Application No. 10-2021-0006507.
English Translation of KR Office Action dated Apr. 15, 2022 for KR Application No. 10-2021-0006507, 4 pages.
EP Office Action dated Mar. 21, 2022 for EP Application No. 21152631, 9 pages.
KR Office Action dated Apr. 15, 2022 for KR Application No. 10-2021-0006507, 3 pages.
Examiner Interview Summary Record (PTOL-413) dated Feb. 16, 2022 for U.S. Appl. No. 17/121,528, 2 pages.
AU Office Action dated Jan. 5, 2022 for AU Application No. 2021200291, 4 pages.
English Translation of KR Office Action dated Jan. 13, 2022 for KR Application No. 10-2021-0006507, 3 pages.
IN Office Action dated Jan. 5, 2022 for IN Application No. 202114002638, 7 pages.
KR Office Action dated Jan. 13, 2022 for KR Application No. 10-2021-0006507, 3 pages.
Office Action received for European Application No. 21152631.4, dated Mar. 21, 2022, 9 pages.
English Translation of JP Office Action dated Jun. 2, 2022 for JP Application No. 2021003633.
JP Office Action dated Jun. 2, 2022 for JP Application No. 2021003633.
AU Office Action dated Oct. 7, 2022 for AU Application No. 2021200291.
EP Summons to attend Oral Proceeding pursuant to Rule 115(1) EPC received for EP Application No. 21152631.4, dated Oct. 7, 2022, 14 pages.
Advisory Action received for U.S. Appl. No. 17/121,528, dated Sep. 2, 2022, 3 pages.
Final Rejection dated Jun. 8, 2022 for U.S. Appl. No. 17/121,528.
Non-Final Rejection dated Dec. 22, 2022 for U.S. Appl. No. 17/121,528.
AU Office Action dated Jan. 4, 2023 for AU Application No. 2021200291.
English Translation of JP Office Action dated Jan. 5, 2023 for JP Application No. 2021003633.
JP Decision to Grant dated Jan. 5, 2023 for JP Application No. 2021003633.
Final Rejection dated Apr. 13, 2023 for U.S. Appl. No. 17/121,528, 23 page(s).
Advisory Action (PTOL-303) dated Jul. 20, 2023 for U.S. Appl. No. 17/121,528, 3 page(s).

* cited by examiner

APPARATUSES,
COMPUTER-IMPLEMENTED METHODS,
AND COMPUTER PROGRAM PRODUCTS
FOR IMPROVED MONITORED BUILDING
ENVIRONMENT MONITORING AND
SCORING

CROSS-REFERENCE TO RELATED
APPLICATIONS

This application is a continuation-in-part of and claims priority to U.S. Non-Provisional application Ser. No. 16/747,479 titled "SMART BUILDING SCORE SYSTEM," filed Jan. 20, 2020, the contents of which are incorporated herein by reference in their entirety.

TECHNOLOGICAL FIELD

Embodiments of the present disclosure generally relate to scoring aspect(s) of a physical environment, such as a building and/or particular portion thereof, and specifically to improved scoring one or more aspect(s) of one or more physical environments based on sensor data monitored from within the physical environment.

BACKGROUND

Systems for scoring aspects of one or more environment(s), such as a building or portion thereof, lack a comprehensive mechanism to provide an indication of the smartness of such environment(s). For example, in the context of scoring a building or portfolio of many buildings, there exist many standards and indices that only focus on certain areas of focus rather than a holistic consideration of the building or portfolio of many buildings. Traditionally, such indices are often determined from survey data, subjective data, and/or previously collected and/or stored data. Applicant has discovered problems with current implementations for scoring of physical environments. Through applied effort, ingenuity, and innovation, Applicant has solved many of these identified problems by developing embodied in the present disclosure, which are described in detail below.

BRIEF SUMMARY

In general, embodiments of the present disclosure provided herein provide for improved monitored building environment monitoring and scoring. Other implementations for improved monitored building environment monitoring and scoring will be, or will become, apparent to one with skill in the art upon examination of the following figures and detailed description. It is intended that all such additional implementations be included within this description be within the scope of the disclosure, and be protected by the following claims.

In accordance with a first aspect of the present disclosure, a computer-implemented method is provided. The computer-implemented method is implementable via any of a myriad of hardware, software, firmware, and/or a combination thereof, as described herein. In at least one example computer-implemented method, the example method includes, at a device with one or more processors and a memory, receiving, via a plurality of environment monitoring sensors positioned in at least one monitored building environment, building monitoring data. The example method further includes determining, for the at least one monitored building environment and based on the building monitoring data, a building operations score set corresponding to a building operations metric set. The example computer-implemented method further includes determining, for the at least one monitored building environment, an overall building operational score based on the building operations score set.

Additionally or alternatively, in some embodiments of the example method, the example method further includes receiving building system financial data for the at least one monitored building environment; and generating a building operations financial score set corresponding to the building operations metric set by applying the building operations score set to a building finance scoring model.

Additionally or alternatively, in some such embodiments of the example method, the example method further includes retrieving, in real-time, building system rate data from a smart utility system; and generating, utilizing the building system rate data, at least one building operations financial score of the building operations financial score set.

Additionally or alternatively, in some embodiments of the example method, the example method further includes causing rendering of a user interface dashboard that comprises at least a building operations financial score of the building operations financial score set.

Additionally or alternatively, in some embodiments of the example method, the example method further includes causing rendering of a user interface dashboard that comprises the building operations financial score set and a benchmark financial standard set.

Additionally or alternatively, in some embodiments of the example method, the example method further includes causing rendering of a user interface dashboard that comprises at least the building operations score set and an benchmark operational score set.

Additionally or alternatively, in some embodiments of the example method, the example method further includes receiving the building monitoring data from at least one of the plurality of environment monitoring sensors in real-time.

Additionally or alternatively, in some embodiments of the example method, the example method further includes determining a sub-metric score set for at least a first building operations metric of the building operations metric set; and determining the building operations score for the first metric based on the sub-metric score set.

Additionally or alternatively, in some embodiments of the example method, the example method further includes generating the first building operations metric based on the sub-metric score set using a predetermined algorithm.

Additionally or alternatively, in some embodiments of the example method, the example method further includes receiving the building monitoring data from the plurality of environment monitoring sensors associated with a plurality of different sensor types.

Additionally or alternatively, in some embodiments of the example method, the at least one monitored building environment includes a first monitored building environment, and the method further includes receiving building monitoring data for a plurality of associated remote monitored building environments comprising at least the first monitored building environment; and determining an overall building operational score for each of the plurality of associated remote monitored building environments.

Additionally or alternatively, in some embodiments of the example method, the example method further includes causing rendering of a user interface dashboard that identifies a preferred monitored building environment of the plurality of remote monitored building environments based on the overall building operational score for each of the plurality of remote monitored building environments, a plurality of building operation score sets for each of the plurality of remote monitored building environments, and/or a plurality of building operations financial score set of the plurality of remote monitored building environments.

Additionally or alternatively, in some embodiments of the example method, the example method further includes determining a portfolio overall building operational score for the plurality of associated remote monitored building environments.

Additionally or alternatively, in some embodiments of the example method, the example method further includes causing rendering of a user interface dashboard that comprises at least a building operations score of the building operations score set.

Additionally or alternatively, in some embodiments of the example method, the example method further includes identifying a monitored building environment type associated with the at least one monitored building environment; and determining at least a building operations score of the building operations score set based on the monitored building environment type and an environment regulatory threshold associated with the at least one monitored building environment type.

Additionally or alternatively, in some embodiments of the example method, the building operations metric set comprises a people metric, a process metric, an assets metric, a connectivity metric, and an environment metric.

Additionally or alternatively, in some embodiments of the example method, the example method further includes categorizing the overall building operational score with at least one other overall building operational score based on a geographic region associated with the at least one monitored building environment.

Additionally or alternatively, in some embodiments of the example method, the example method further includes generating a metric weight set corresponding to the building operations metric set; and determining the overall building operational score based on the metric weight set.

Additionally or alternatively, in some embodiments of the example method, the example method further includes determining, based on a look-up table, a monitored building environment type associated with the at least one monitored building environment based on the overall building operational score.

Additionally or alternatively, in some embodiments of the example method, the example method further includes maintaining a database that stores the building operations score set, the building monitoring data, and/or the overall building operation score.

Additionally or alternatively, in some embodiments of the example method, the one or more processors and/or the memory exist in a cloud environment from the at least one monitored building environment.

Additionally or alternatively, in some embodiments of the example method, the building operations metric set includes a people metric associated with a comfort access sub-metric, a safety sub-metric, a security sub-metric, an information access sub-metric, and/or a happiness index sub-metric.

Additionally or alternatively, in some embodiments of the example method, the building operations metric set includes a process metric associated with a mean time to repair metric, a number of maintenance predictions metric, and/or a number of maintenance preventions metric.

Additionally or alternatively, in some embodiments of the example method, the building operations metric set includes an assets metric associated with a mean time between failures metric, an availability metric, a probability of failure metric, and a mean time to failure metric.

Additionally or alternatively, in some embodiments of the example method, the building operations metric set includes a connectivity metric associated with a mean time between updates metric, an IoT connectivity metric, and/or an uptime metric.

Additionally or alternatively, in some embodiments of the example method, the building operations metric set includes an environment metric associated with an electric consumption metric, a water consumption metric, a gas consumption metric, a renewable energy generation metric, a greenhouse gas emission metric, and/or a carbon footprint metric.

Additionally or alternatively, in some embodiments of the example method, the example method further includes determining a notification action associated with at least one of the building operations metrics set.

In accordance with yet another aspect of the present disclosure, a system is provided. The system includes any number of specially configured computing devices, as described herein. In one example embodiment system, the example system includes one or more processors, and a memory including computer program code stored thereon that, in execution with the one or more processors, is configured to perform any one of the example methods described herein.

In accordance with yet another aspect of the present disclosure, a non-transitory computer-readable storage medium is provided. The non-transitory computer-readable storage medium includes computer program code for execution by one or more processors of a device. The computer program code is configured to, when executed by the one or more processors, cause the device to perform any one of the example methods described herein.

BRIEF DESCRIPTION OF THE DRAWINGS

Figure 1:
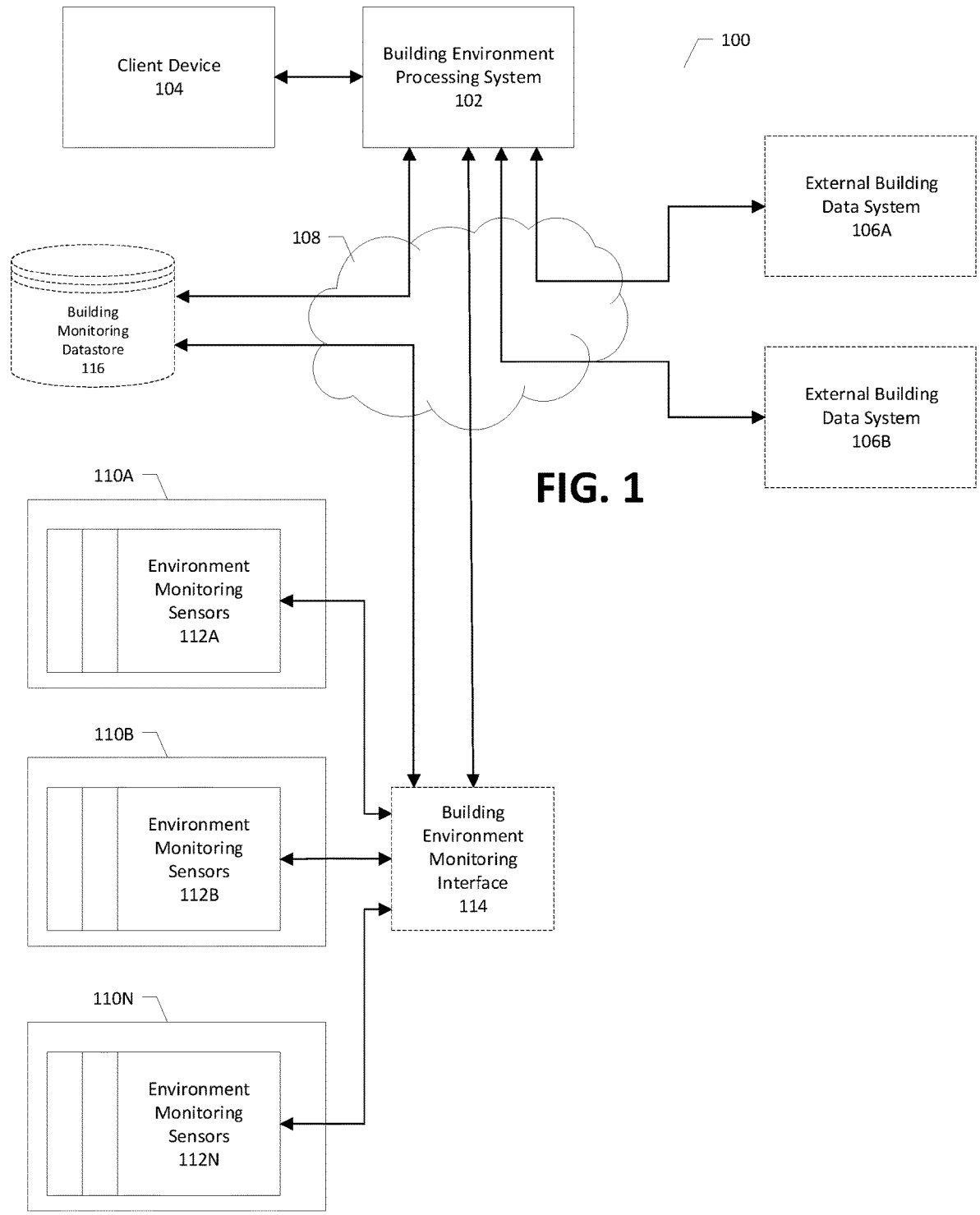
Figure 2:
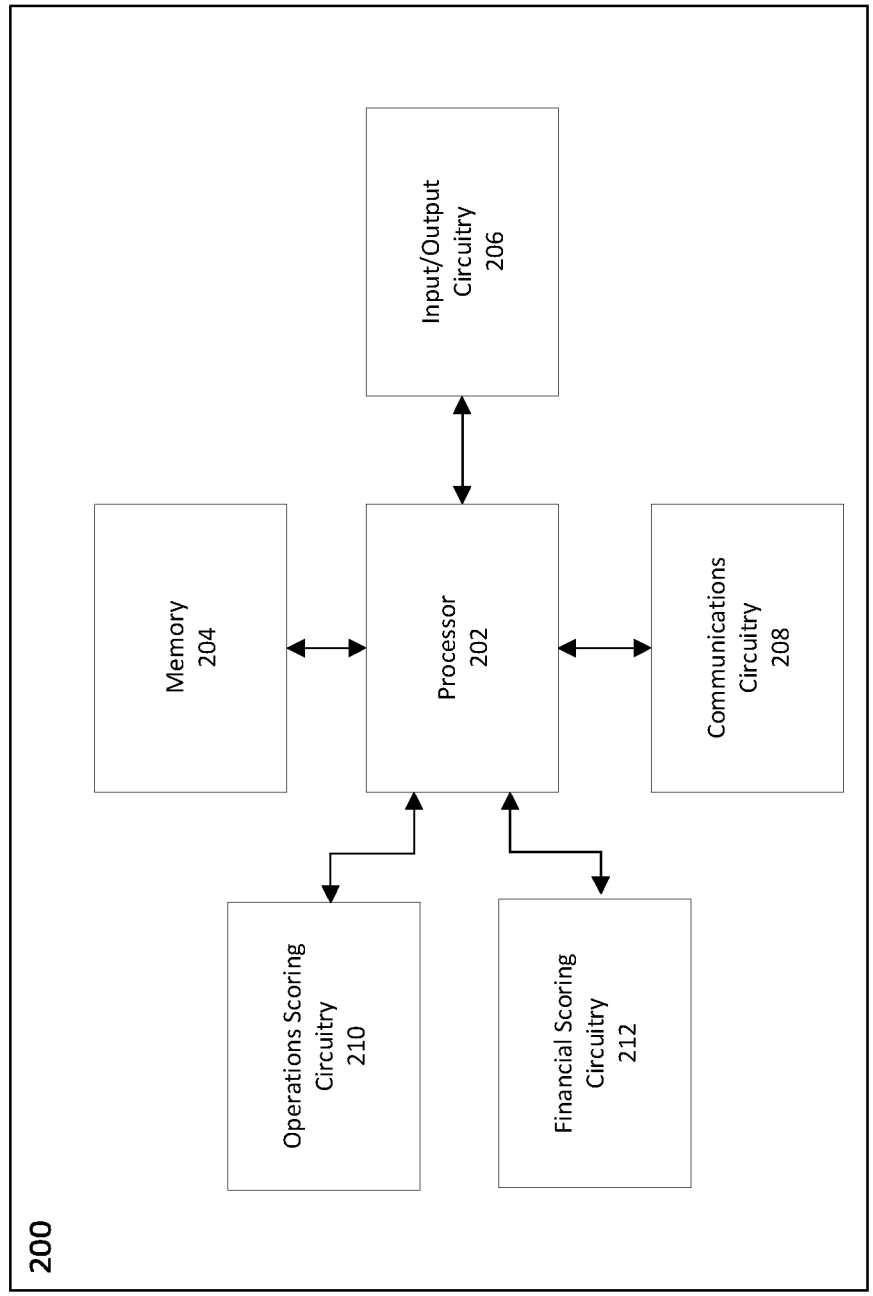
Figure 3:
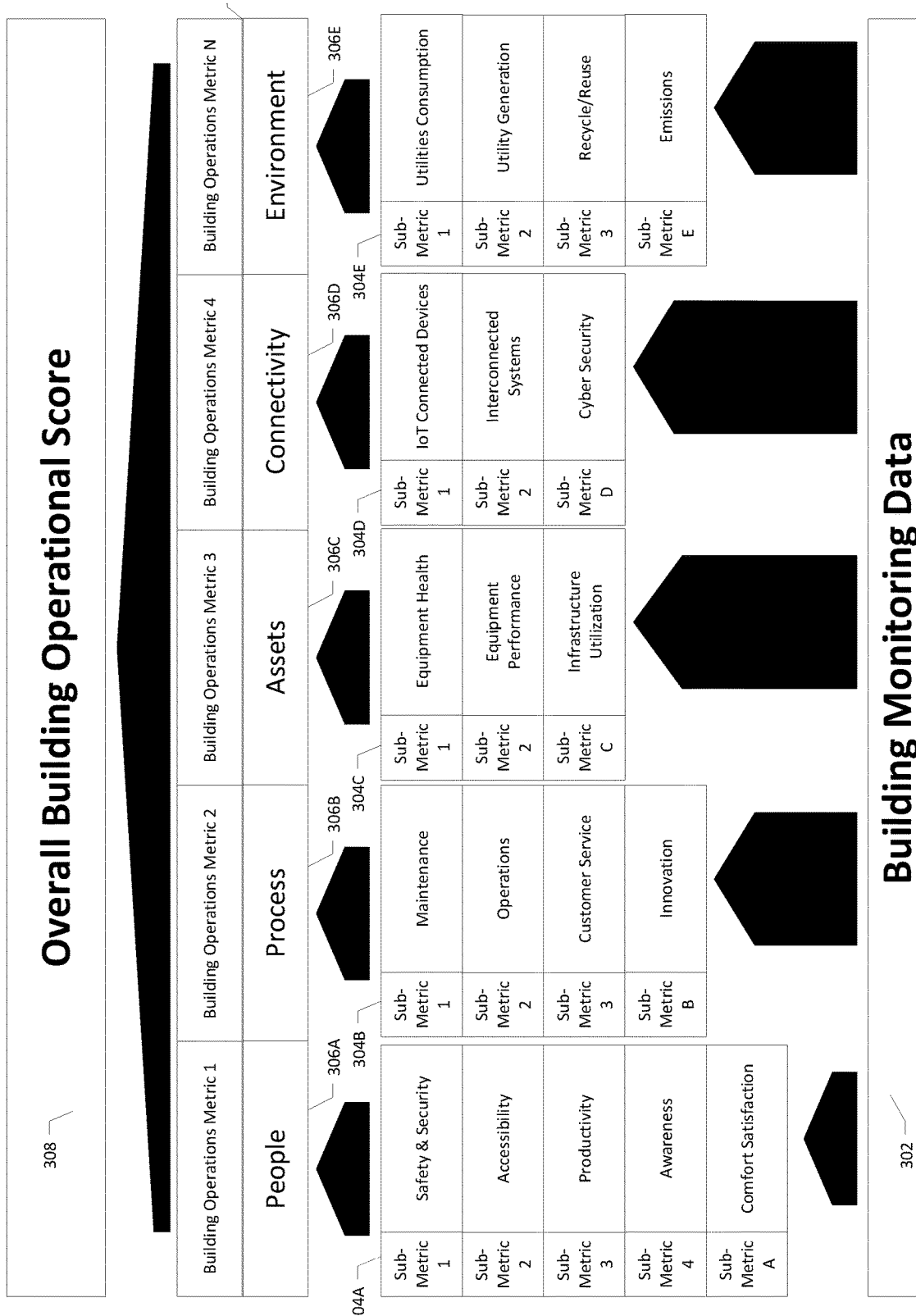
Figure 4:
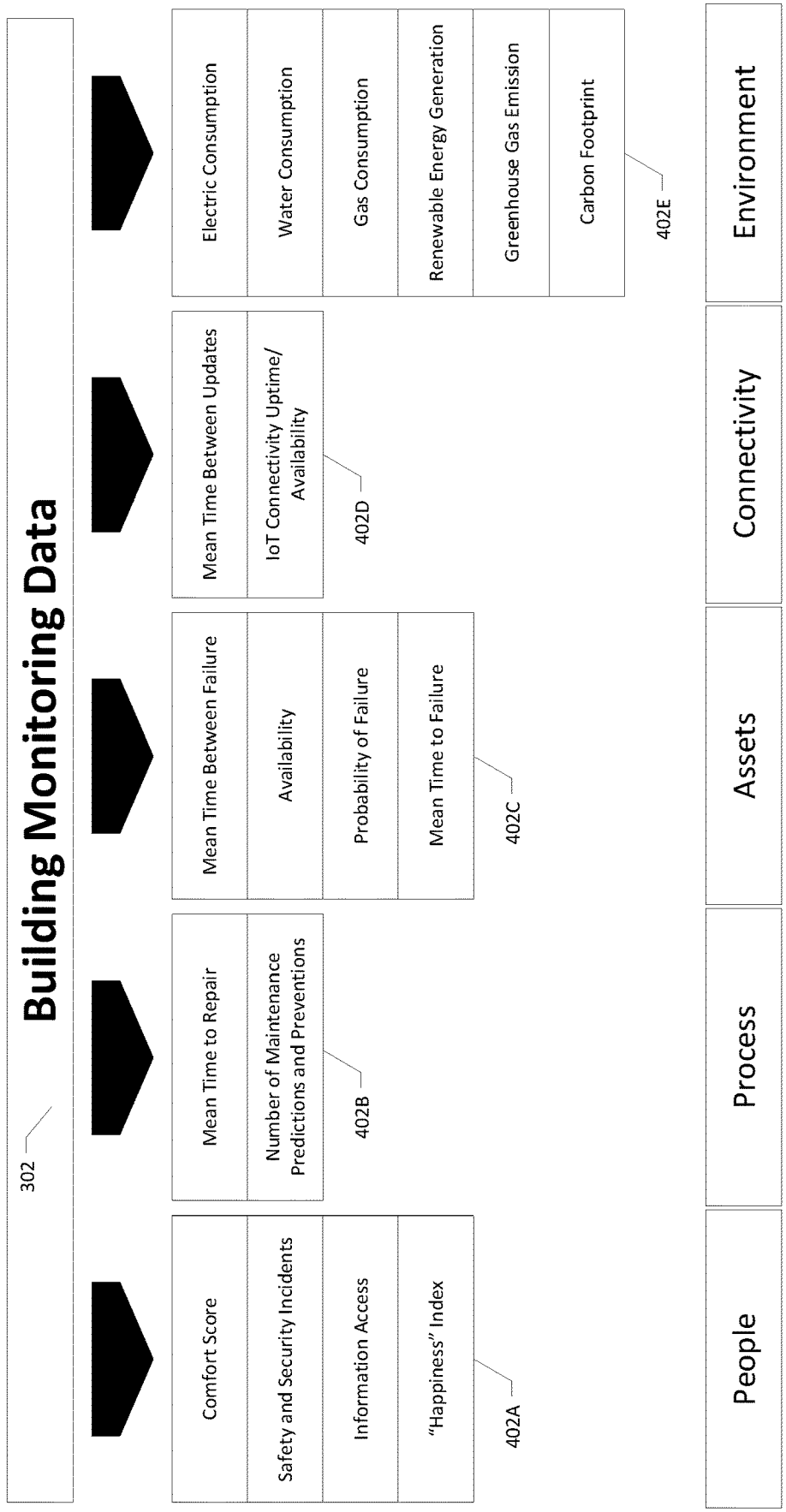
Figure 5:
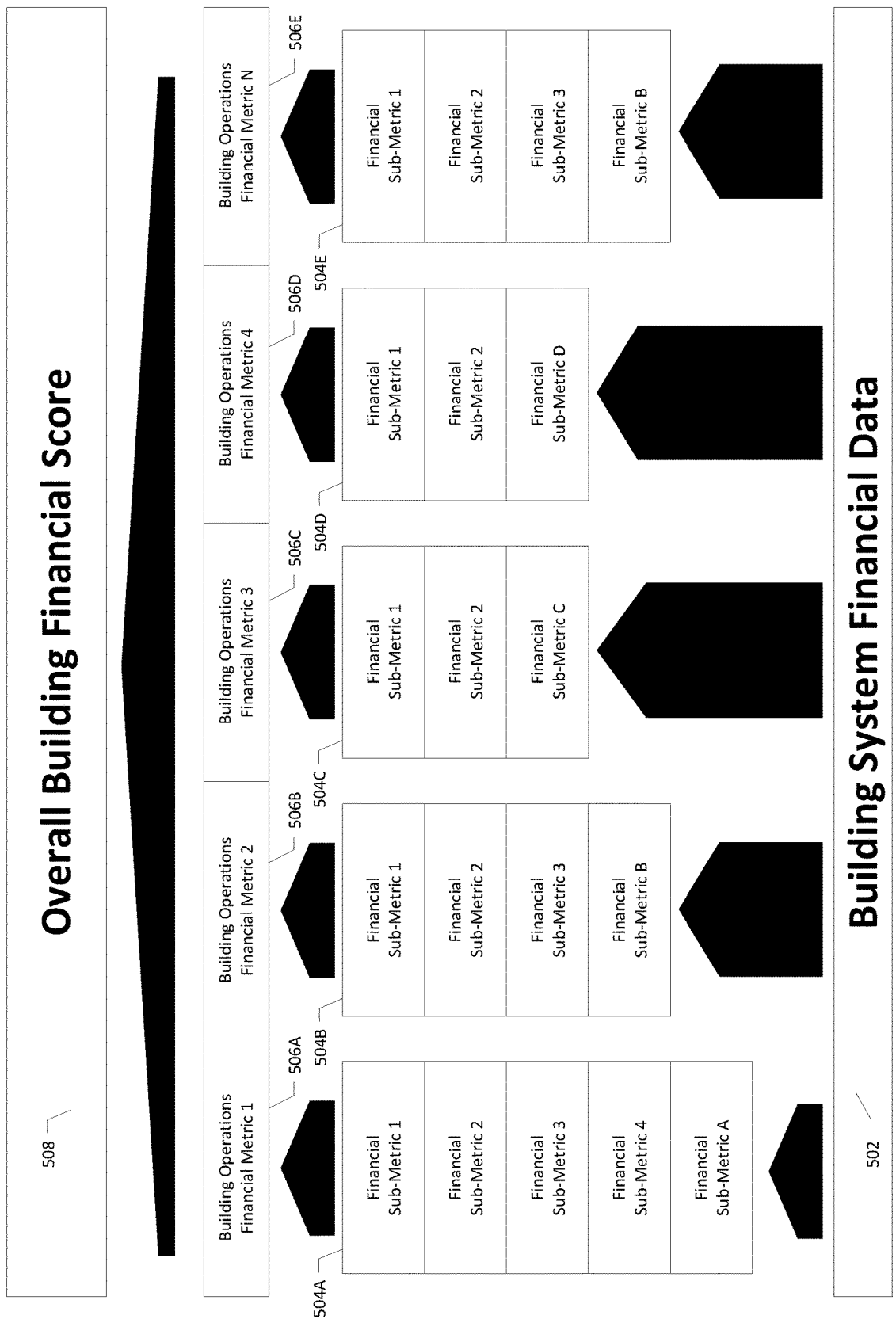
Figure 6:
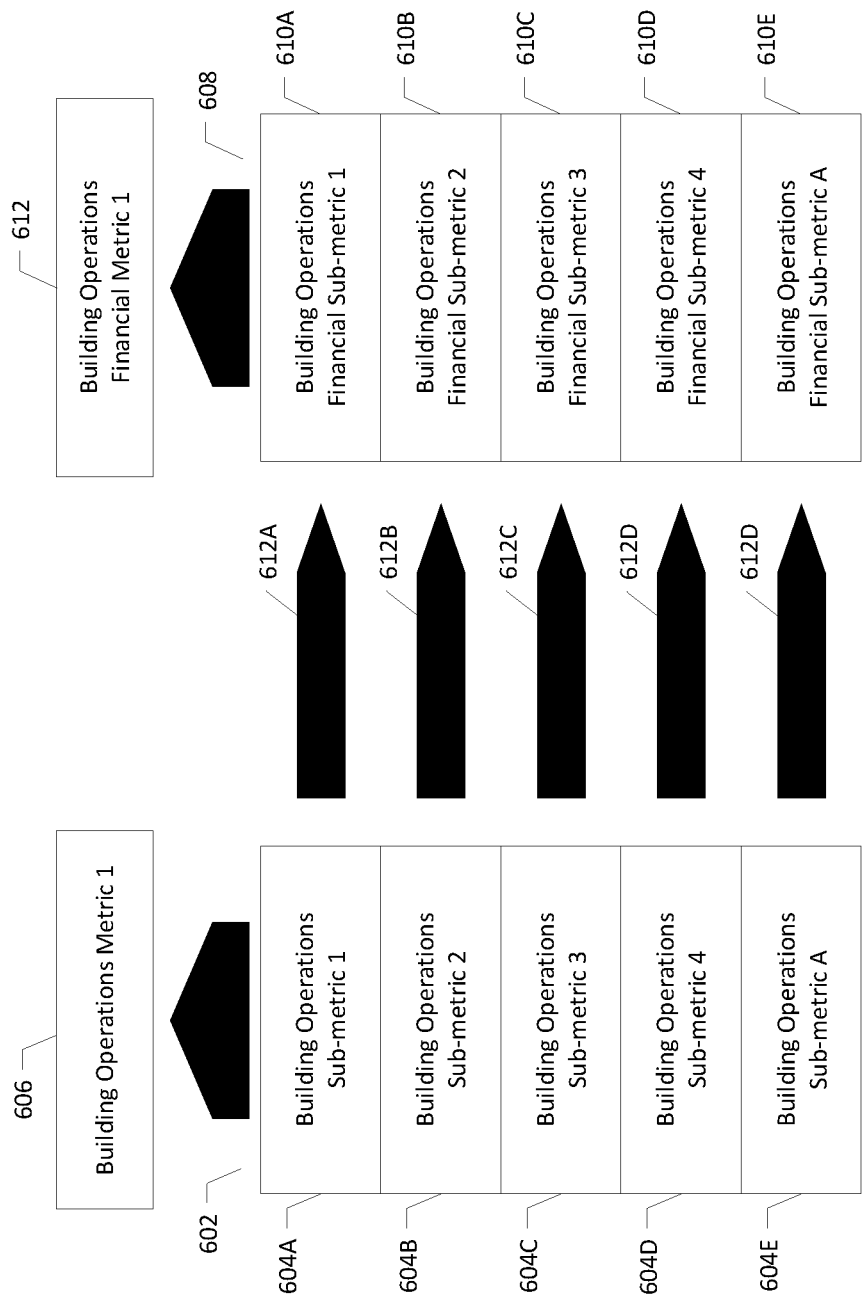
Figure 7:
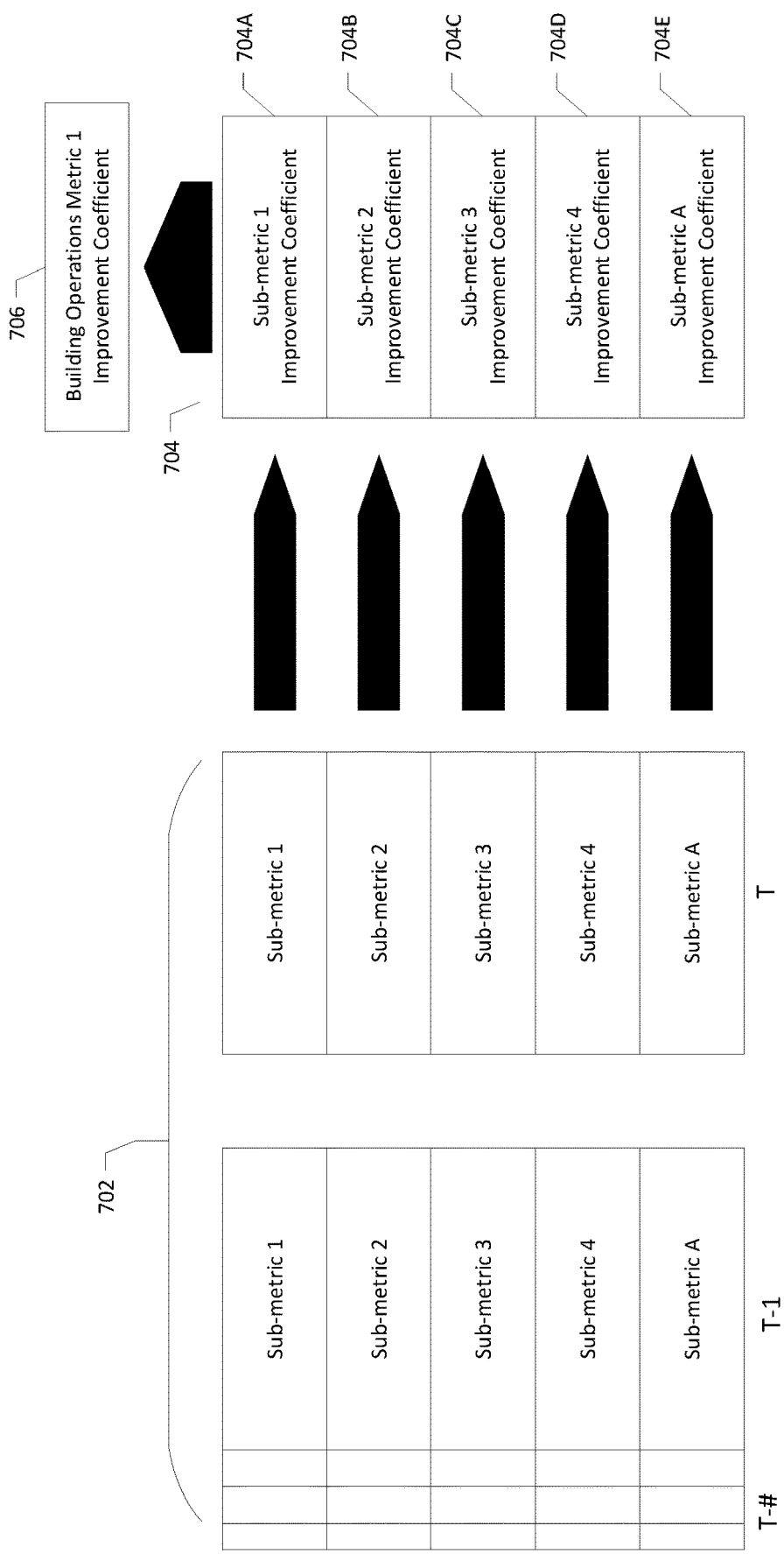
Figure 8:
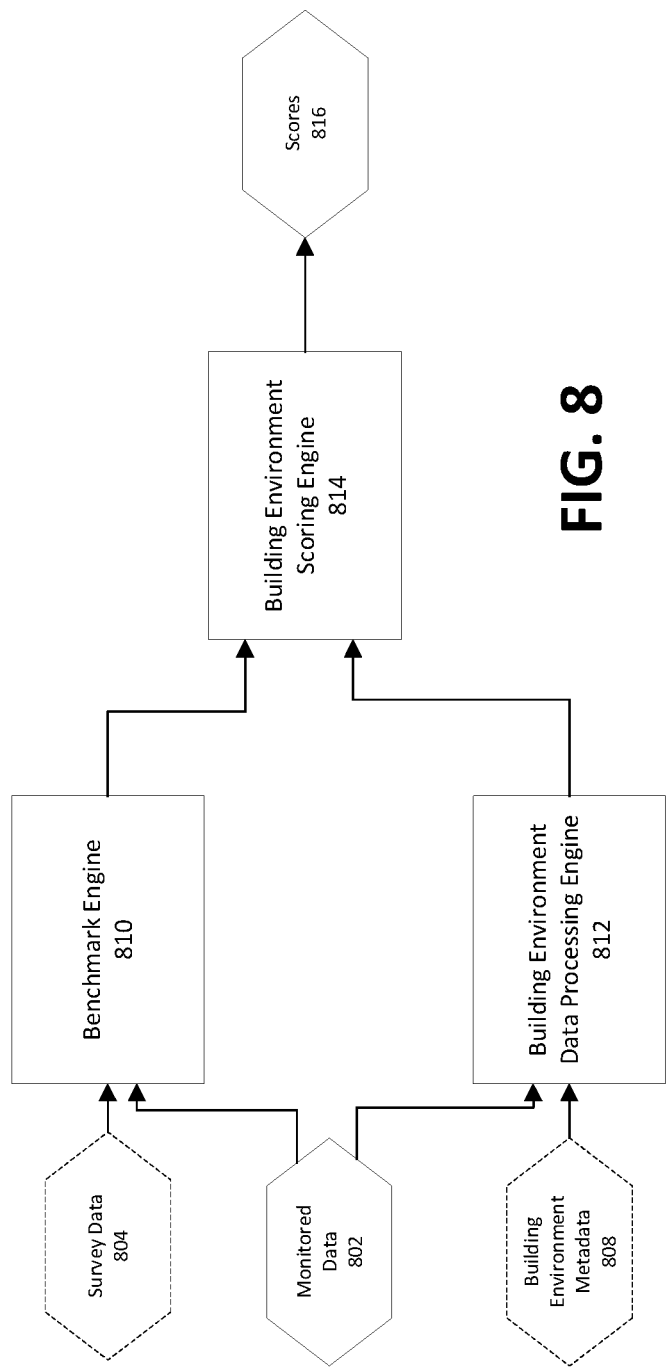
Figure 9:
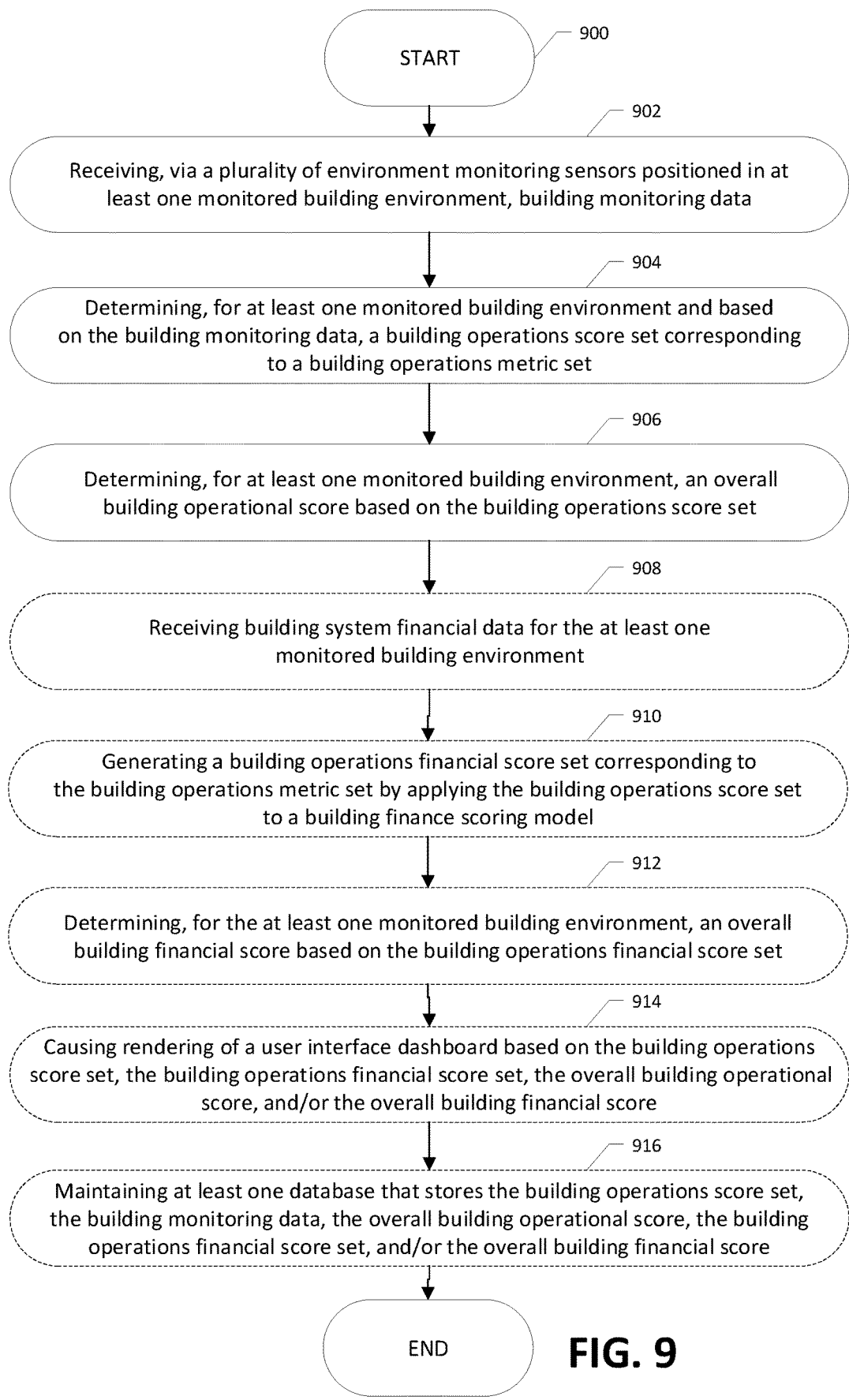
Figure 10:
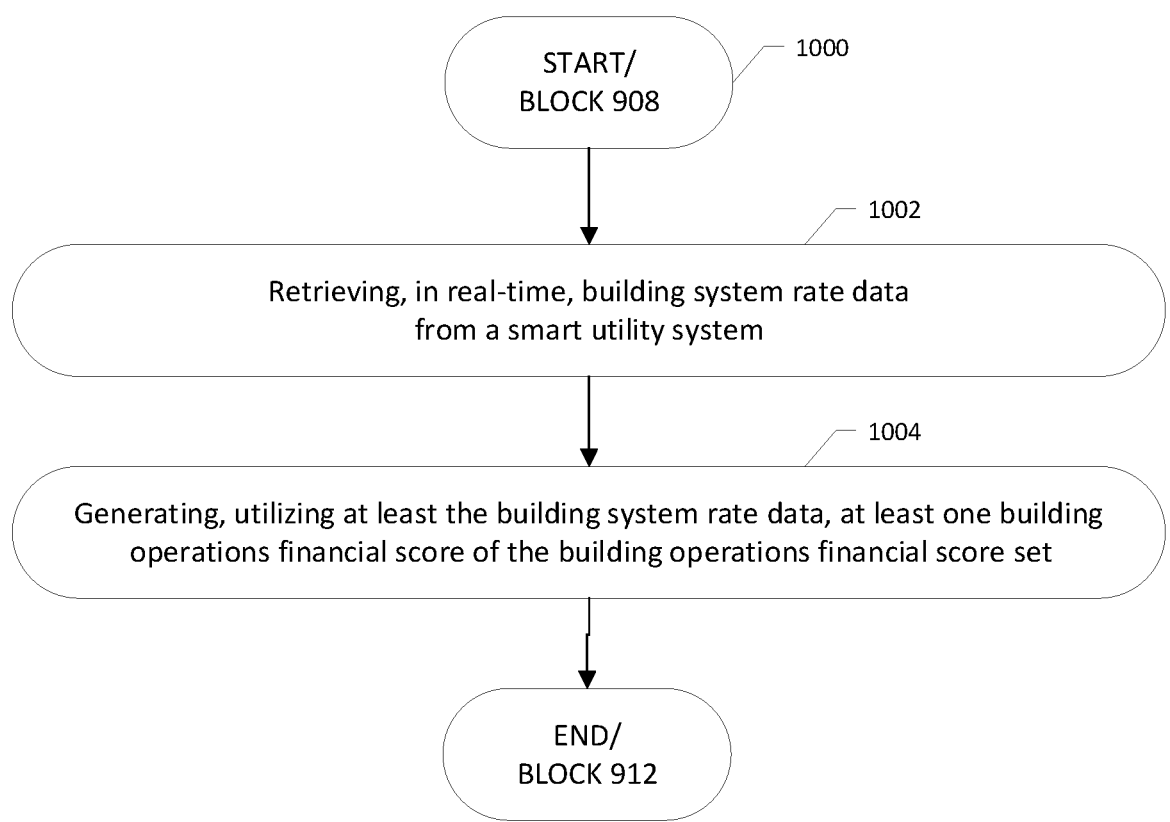
Figure 11:
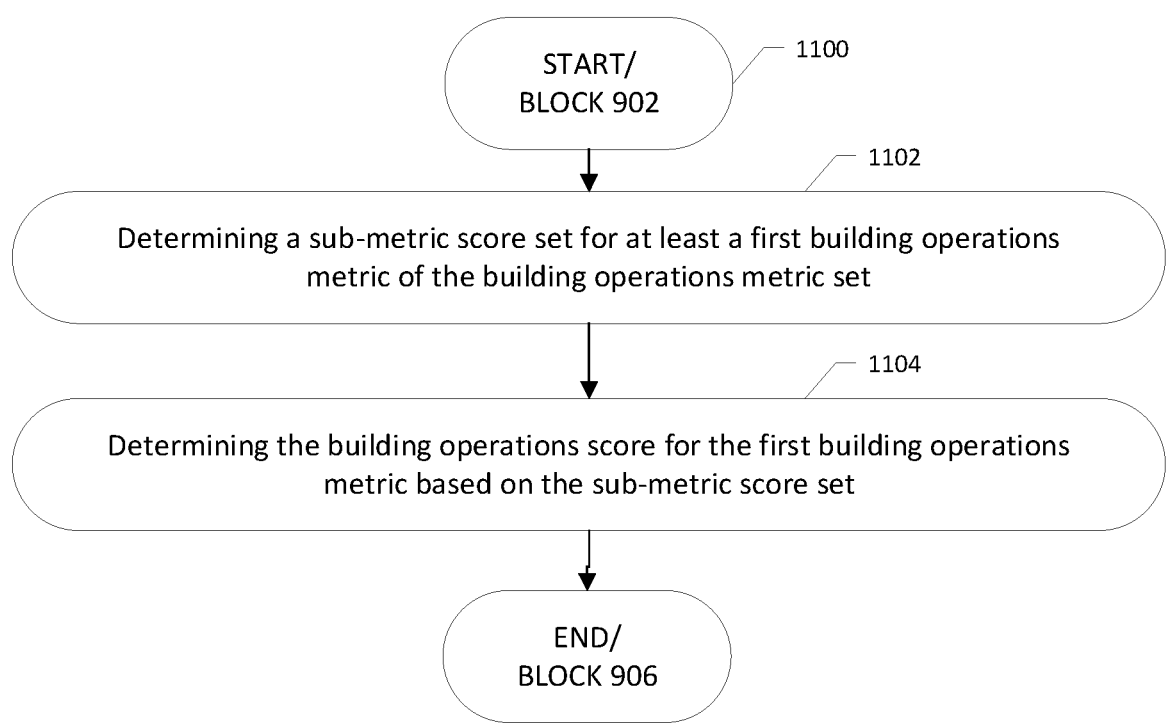
Figure 12:
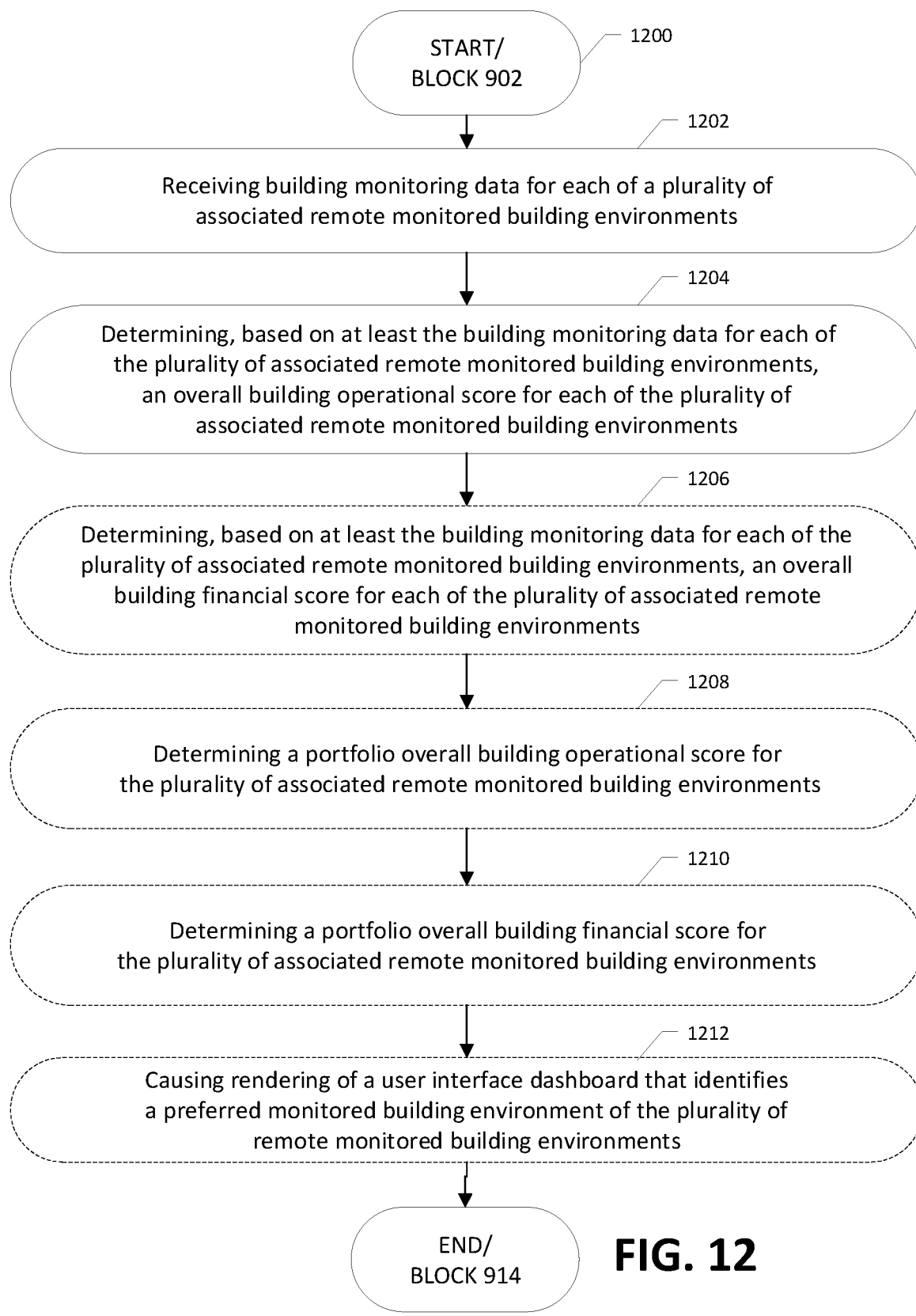
Figure 13:
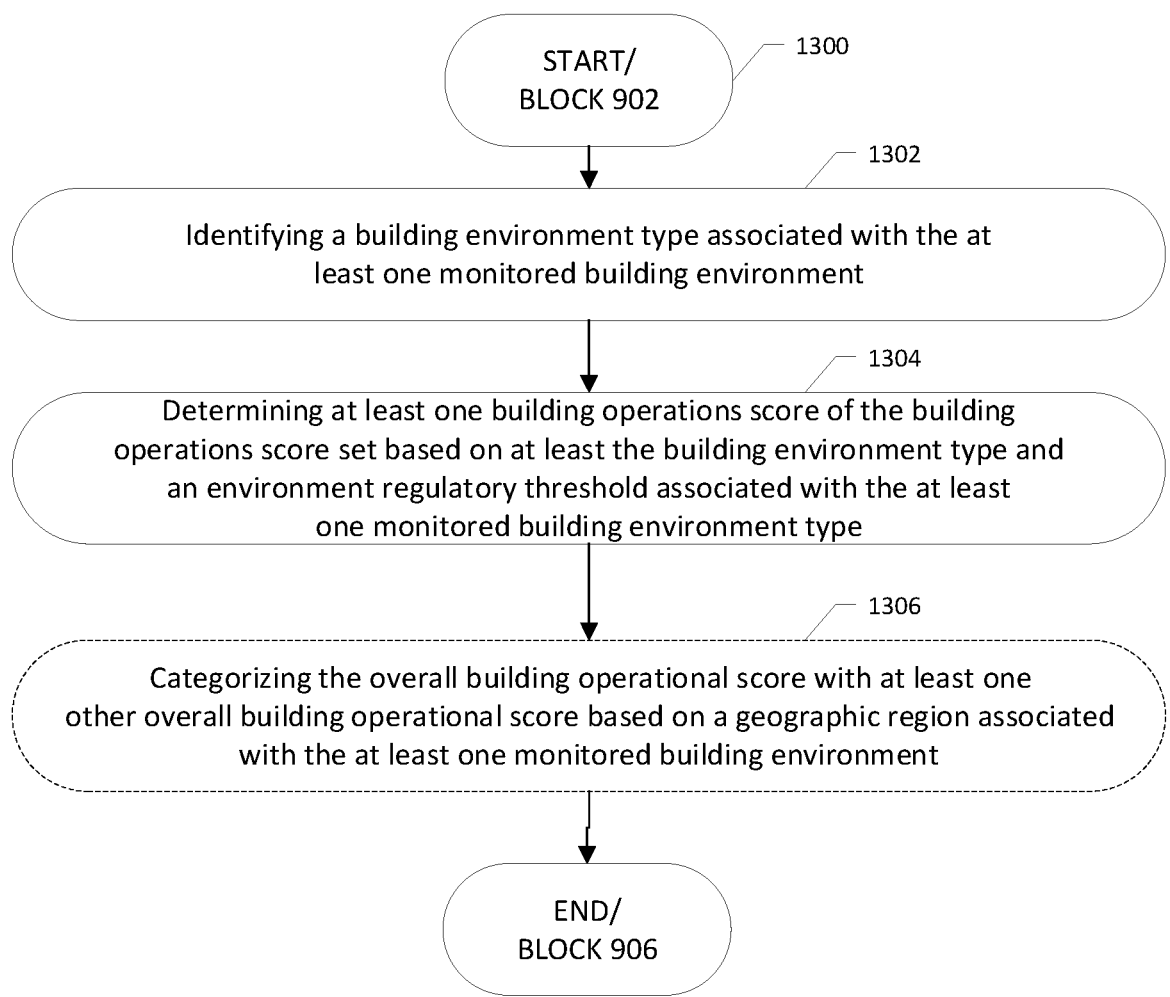
Figure 14:
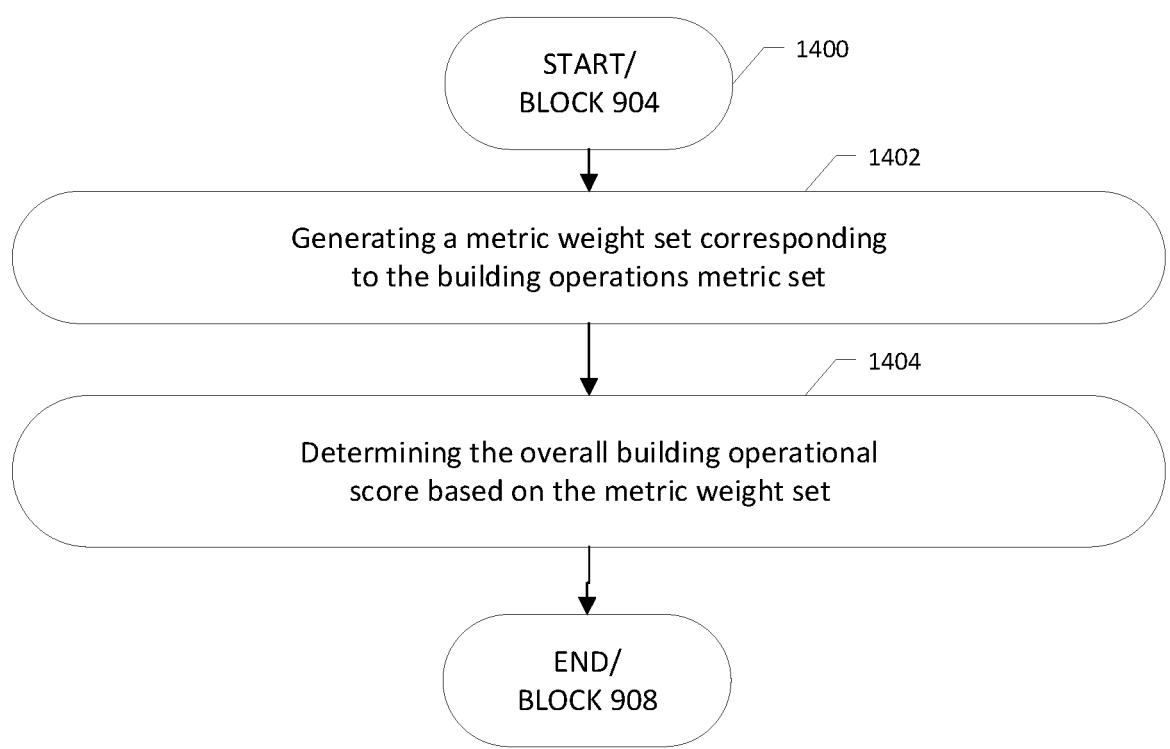
Figure 15:
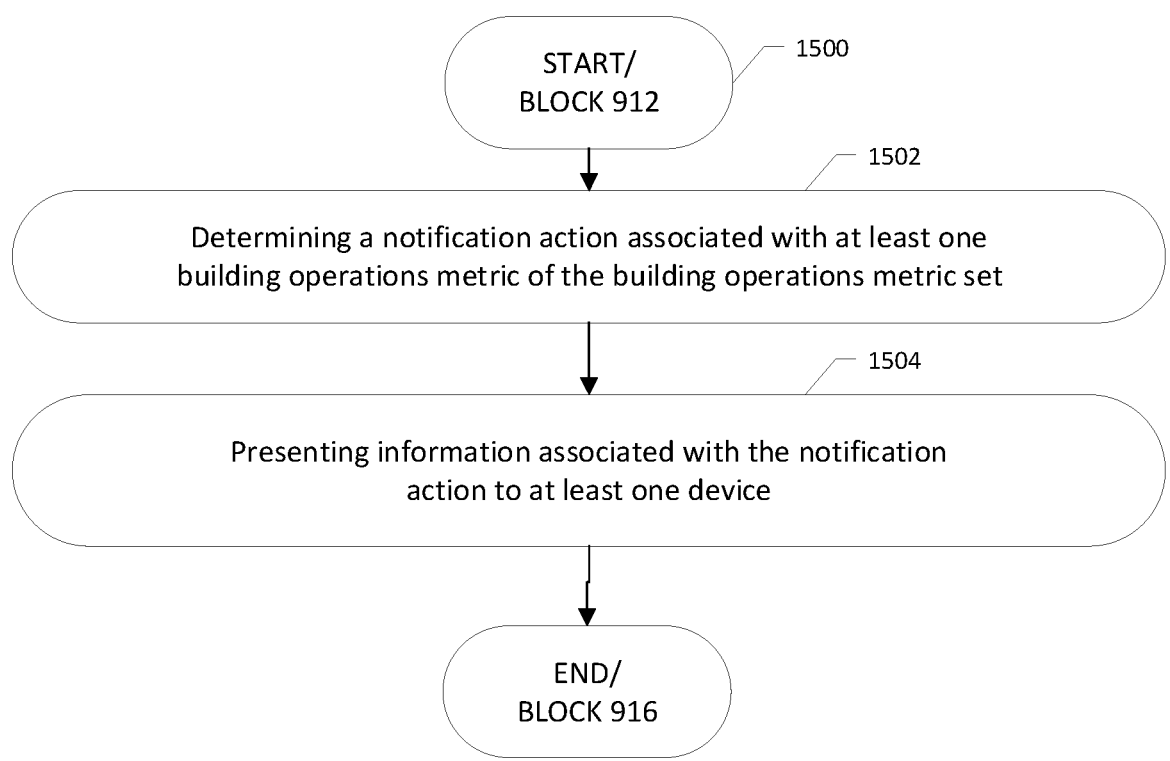

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with at least some example embodiments of the present disclosure;

FIG. 3 illustrates example data values maintained as part of an example computing environment in accordance with at least some example embodiments of the present disclosure;

FIG. 4 illustrates example data values maintained as part of an example computing environment in accordance with at least some example embodiments of the present disclosure;

FIG. 5 illustrates example data values maintained as part of an example computing environment in accordance with at least some example embodiments of the present disclosure;

FIG. 6 illustrates example data values maintained as part of an example computing environment in accordance with at least some example embodiments of the present disclosure;

FIG. 7 illustrates example data values maintained as part of an example computing environment in accordance with at least some example embodiments of the present disclosure;

FIG. 8 illustrates a data flow for an example system in accordance with at least some example embodiments of the present disclosure;

FIG. 9 illustrates a flowchart depicting operations of an example process for improved monitored building environment scoring in accordance with at least some example embodiments of the present disclosure;

FIG. 10 illustrates a flowchart depicting additional operations of an example process for improved monitored building environment scoring in accordance with at least some example embodiments of the present disclosure;

FIG. 11 illustrates a flowchart depicting additional operations of an example process for improved monitored building environment scoring in accordance with at least some example embodiments of the present disclosure;

FIG. 12 illustrates a flowchart depicting additional operations of an example process for improved monitored building environment scoring in accordance with at least some example embodiments of the present disclosure;

FIG. 13 illustrates a flowchart depicting additional operations of an example process for improved monitored building environment scoring in accordance with at least some example embodiments of the present disclosure;

FIG. 14 illustrates a flowchart depicting additional operations of an example process for improved monitored building environment scoring in accordance with at least some example embodiments of the present disclosure; and FIG. 15 illustrates a flowchart depicting additional operations of an example process for improved monitored building environment scoring in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Various users, businesses, and other entities benefit control, own, operate, and/or are otherwise associated with various monitored building environment(s). For example, in some circumstances, a particular entity owns or otherwise controls one or more building(s) utilized for any of a myriad of purposes (e.g., residential buildings, office buildings, commercial stores of various types, etc). Often, an entity performs any of a number of processes in attempts to quantify various aspects of such monitored building environment(s). For example, traditionally a score may be generated for various independent indices known in the art, such as an energy efficiency score, a water consumption score, a safety score, or the like. Use of such indices often does not provide a sufficient holistic insight into the operations of the monitored building environment overall. For example, often the data utilized to calculate the values include subjective data, survey data, and/or outdated previously-collected data that fails to provide an up-to-date and accurate holistic of the monitored building environment overall. These deficiencies often such make such indices difficult for use in improving the overall operations of a monitored building environment. Such deficiencies also make it difficult for a user to allocate resources in an appropriate manner that optimally improves operations of a monitored building environment, for example due to the independent nature of each index being considered.

Further, conventional resource allocation is often performed based on tradeoffs between metrics and/or prioritization of certain metrics over other metrics. Such conventional resource allocation is performed without due consideration for interdependency between the metrics, and instead views each metric merely as independent. For example, in circumstances where a first metric and a second metric are determined deficient independently, resources are often allocated to each of the first metric and second metric without determination of whether resources allocated merely to the first metric or the second metric would be sufficient to reach a desired level of operations with respect to any given aspect by which a building environment is scored. In this regard, poor resource allocation often results by over-allocating resources to metrics associated with a particular aspect and/or under-allocating resources to other metrics associated with another aspect.

Such deficiencies are made more complex in aggregating and utilizing data highlighting different aspects of operations within building environment(s). Metrics are often compared with each other individually, and defining any relationship between such metrics is not readily defined. In this regard, accurately defining relationships between otherwise unrelated data properties to enable scoring of a building environment with respect to particular aspects desired for consideration is not sufficiently performed in conventional systems.

Such deficiencies are further exacerbated when an entity is associated with monitoring and scoring multiple monitored building environments. For example, in a circumstance where an entity controls, owns, operates, and/or otherwise is associated with multiple monitored building environments, it becomes increasingly difficult for the entity to score various indices for each monitored building environment with sufficient consistency for such indices to always be up-to-date. Additionally or alternatively, such indices fail to provide an efficient and/or effective mechanism for comparing distinct monitored building environments in an accurate and efficient manner. Additionally or alternatively still, such indices fail to enable portfolio-level consideration of the multiple monitored building environments associated with a particular entity.

Accordingly, the inventors have identified a need exists in the field of monitored building environment monitoring and scoring to provide up-to-date, frequent scoring of various metrics. Additionally, the inventors have identified a need for more holistic scorings of various aspects of one or more monitored building environment(s) on their own and/or with respect to a particular portfolio of multiple monitored building environments. Additionally, the inventors have identified a need for the scores associated with particular metrics to serve as sub-metrics for a metric representing an aspect of building operations correlated with each of the sub-metrics, and for such sub-metric score(s) to be comparable and/or analyzable individually, or in aggregate with the score(s) for comparison and/or analyzing at the metric-level. Additionally, the inventors have identified a need for the use of benchmark data to enable comparison of various aspects of building operations to be comparable for any number of monitored building environments as well as against an industry standard.

Embodiments of the present disclosure provide for improved monitoring and scoring of various aspects of one or more monitored building environments. In this regard, an overall building operations score is determinable that embodies a characterization of the "smartness" of a particular monitored building environment. The overall building operations score in some example embodiments is determinable from building monitored data received from one or more environment monitoring sensors position in the monitored building environment. In this regard, the overall building operations score integrates advanced automated technologies, such as those that control operations of a monitored building environment, to represent the smartness of the monitored building environment.

By leveraging interactions with in-environment sensors, smart technologies, and/or other real-time monitoring devices, embodiments enable collection and processing of real-time data representing various aspects of the monitored building environment. In this regard, embodiments generate overall building operational scores, corresponding building operations metric score(s), and/or building operations sub-metric score(s) in a manner that improves the accuracy and/or completeness of such scores. Additionally or alternatively, in this regard, such embodiments additionally improve the consistency at which such scores can be determined, for example by enabling real-time generation based on real-time data at any requested or desired time.

Further, at least some embodiments herein leverage building system financial data that enables further processing of such building operations score(s) to provide financial contexts associated with the operations. In some embodiments, by leveraging building system financial data retrieved in real-time, determined building operations financial score(s) represent up-to-date financial aspects of operations of such monitored building environments. In this regard, as changes in operations of a monitored building environment occur, the corresponding score(s) may reflect the financial impact of such changes on various aspects as they occur.

By processing real-time monitoring data, some embodiments are enabled to continually learn and optimize its data to improve efficiencies, reduce costs, and remain competitive in the market. Such advantages are further provided associated with portfolio-level considerations for a plurality of monitored building environments.

Additionally or alternatively, in some contexts, the various metrics enable a framework by which monitored building environment(s) and/or multiple building environment(s) may be monitored for continuous improvement. For example, in some circumstances the various aspects embodied by each of the building operations metrics represent a "smartness" of the monitored building environment(s). In this regard, improvements to the various building operations score(s) of the building operations metric(s) provide a framework for monitoring the improvements to the "smartness" of such monitored building environment(s).

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "environment monitoring sensor" refers to a computing system configured to read and/or otherwise capture certain values associated with a building environment and/or operations associated therewith or therein. In some embodiments, the environment monitoring sensor is configured to capture data values representing one or more aspects of the environment around the sensor. Non-limiting examples of an environment monitoring sensor include, without limitation, various sensor types, including without limitation: IoT devices, connected equipment, utility systems, building security systems, building operational systems.

The term "monitored building environment" refers to a particular building or portion of a building for which operations data is monitored via one or more computing systems. In some embodiments, a monitored building environment is associated with and/or otherwise represented by a unique identifier or other data value that identifies the monitored building environment.

The term "building monitoring data" refers to electronically managed data representing functioning of one or more operations within a monitored building environment. Non-limiting examples of a building monitoring data include a level of an environmental condition within a monitored building environment, a data readout of a sensor and/or system within a monitored building environment, data values embodying functioning of a system within and/or associated with a monitored building environment, existence of the system in or associated with operations of a building environment, time a system in or associated with a monitored building environment is active or functional, and/or a consumption rate of a utility by or associated with a building environment.

The term "building operations score" refers to an electronically managed data value for a particular building operations metric or sub-metric that represents how well the operations associated with a building environment meet desired aspects represented by the building operations metric and/or sub-metric. The building operations score can represent an absolute value associated with the building operations metric and/or sub-metric, and/or a percentile value based on corresponding benchmark data. In some embodiments, a building operations score is determinable based on a relevant portion of building monitoring data and/or data values derived therefrom. The term "building operations score" refers to one or more data objects embodying any number of building operations score(s).

The term "data property" refers to an aspect of measurable and/or determinable operation associated with a particular monitored building environment for which a corresponding data value is determinable. In some embodiments, the data value for a defined set of data properties is used to determine a corresponding building operations score.

The term "building operations metric" refers to a high-level aspect of building operations for which a corresponding building operations score is determinable. In some embodiments, a building operations metric set defines any number of aspects for which a monitored building environment is to be scored. Non-limiting examples of a building operations metric include an assets metric, a people metric, a process metric, an environment metric, and a connectivity metric.

The terms "building operations sub-metric" and "sub-metric" refer to a sub-aspect of a building operations metric by which a building environment may be analyzed. The terms "sub-metric score" refers to a building operations score corresponding to a particular building operations sub-metric.

The term "overall building operational score" refers to an electronically managed data value that represents how well a monitored building environments meets various desirable high-level aspects represented by one or more building operations metrics. In some embodiments, an overall building operational score is determinable from a set of building operations scores corresponding to the set of building operations metrics utilized to determine the corresponding overall building operational score. In some embodiments, an overall building operational score represents an absolute data value associated with operations of a monitored building environment operations, or a percentile data value associated with operations of a monitored building environment based on particular benchmark data.

The term "building system financial data" refers to financial data relevant to determining the overall financial impact of operations associated with a particular monitored building environment. Non-limiting examples of building system financial data include data values representing a cost per unit of consumption, a rate of consumption, cost, an income produced associated with a monitored building environment.

The term "building operations financial score" refers to electronically managed data representing a financial impact of or associated with a building operations metric based on received data. In some embodiments, building operations financial score embodies a return on investment associated with a monitored building environment, a cost of one or more operations of a monitored building environment, and/or another financial indicator associated with a monitored building environment. The building operations financial score can represent an absolute value associated with the building operations financial metric and/or sub-metric, and/or a percentile value based on corresponding benchmark data.

The term "overall building financial score" refers to an electronically managed data value that represents how well a monitored building environments meets various desirable high-level financial aspects represented by one or more building operations financial metrics. In some embodiments, an overall building financial score is determinable from a set of building operations financial scores corresponding to the set of building operations financial metrics utilized to determine the corresponding overall building financial score. In some embodiments, an overall building financial score represents an absolute data value associated with the financial aspect for operations of a monitored building environment operations, or a percentile data value associated with the financial impact for operations of a monitored building environment based on particular benchmark data.

The term "building finance scoring model" refers to a predefined and/or custom algorithm that generates a building operations financial score based on at least one building operation score for at least one building operations metric and/or sub-metrics. In some embodiments, a building finance scoring model utilizes building system financial data and building operations score(s), and/or corresponding building monitoring data.

The term "building system rate data" refers to electronically managed data representing a financial cost of consumption of a particular resource provided by and/or otherwise associated with a utility system. Non-limiting examples of building system rate data include cost-per-consumption unit metric, for example cost per rate of use for natural gas, electricity, water, propane, and/or oil.

The term "smart utility system" refers to one or more computing devices that monitor consumption of a particular resource at a particular building environment, and/or that maintain static or dynamic building system rate data associated with the rate of consumption of such a resource. Non-limiting examples include electricity monitoring systems, water monitoring systems, natural gas monitoring systems, propane monitoring systems, and oil monitoring systems.

The term "user interface dashboard" refers to user-facing rendered data renderable via a client device that includes information and/or sub-elements representing one or more aspects of a monitored building environment and/or scores associated therewith for a particular user. In some embodiments, a user interface dashboard includes one or more score(s) for any number of monitored building environments associated with a particular user.

The term "benchmark standard" refers to one or more data value(s) representing a range of score(s), average score, and/or other benchmark value associated with a particular building operations metric, building operations sub-metric, or particular data property based on any of a number of building environments associated with any number of users. In some embodiments, a benchmark standard is determined from a particular set of building environments defined by any of a myriad of shared classifications. The term "benchmark financial standard" refers to a benchmark standard for one or more overall building financial scores, one or more building operations financial metric, one or more building operations financial sub-metric, and/or one or more building operations financial data property. The term "benchmark operations standard" refers to a benchmark standard for one or more overall building operational score, one or more building operations metric, one or more building operations sub-metric, and/or operations data property.

The term "predetermined algorithm" refers to a user-provided, static, and/or hard-coded function that performs one or more specific processes to determine an output corresponding to provided inputs.

The term "sensor type" refers to a determinable electronically managed data value representing identifiable aspects of an environment monitoring sensor. Non-limiting examples of a sensor type include a sensor make and/or models of an environment monitoring sensor, and/or classification of environment monitoring sensor based on a general human-assigned classification. Non-limiting examples of a sensor type include, without limitation, an Internet-of-Things device, connected equipment, utility systems, building security systems, and building operational systems).

The term "associated remote" in the context of monitored building environments refers to physically separated building environments that are each linked to and/or otherwise associated with one another based on a connection with a particular user and/or corresponding user account.

The term "preferred monitored building environment" refers to a monitored building environment that ranks highest based on one or more values and/or based on a combination of values.

The term "portfolio overall building operational score" refers to a value representing the overall operations for all of a plurality of monitored building environments. In some embodiments, a portfolio overall building operational score is determined utilizing a predetermined algorithm that processes overall building operational score(s) associated with each of a plurality of monitored building environments. In some embodiments, a portfolio overall building operational score is determined based on an average of one or more scores associated with each of the monitored building environments, a weighted average of one or more scores associated with each of the monitored building environments, and/or another determinable predefined algorithm that utilizes one or more scores associated with each of the monitored building environments.

The term "building environment type" refers to an electronically managed data value representing a classification of the monitored building environment and/or an association of the monitored building environment with a particular type of activity and/or business from a determinable set of possible categories. Non-limiting examples of a building environment type include a data value of a set of values representing Energy Information Administration (EIA) building types.

The term "environment regulatory threshold" refers to one or more threshold values, or ranges of threshold values, set by a regulatory and/or governmental agency associated with one or more aspects and/or operations of a building environment. Non-limiting examples include air pollutant maximum threshold(s), energy consumption threshold(s), and the like, set by a governmental or regulatory body for one or more types of building environments.

The term "geographic region" refers to electronically managed data representing a physical location associated with a monitored building environment.

The term "metric weight" refers to an electronically managed data value determined or user-input utilized for weighting an associated building operations metric of a building operations metric set for use in one or more predefined algorithm(s), for example utilized as part of a weighted average calculation. In some embodiments a metric weight set including any number of metric weights is utilized for determining an overall building operational score based on a weighted average of associated building operations scores in a building operations score set.

The term "look-up table" refers to one or more data objects embodying a mapping between a particular aspect to one or more data value(s).

The term "cloud environment" with respect to one or more computing device(s) refers to a physical location of computing hardware that is separate from a physical location associated with other computing hardware, where the remote computing hardware is accessed utilizing one or more communications networks.

The term "notification action" refers to electronically managed data embodying data instructions and/or information associated with a building operations metric that provides a prediction regarding changes to the building operations score associated with the building operations metric, a recommendation for improving the building operations score associated with the building operations metric, and/or notification information associated with the building operations score for the building operations metric. Non-limiting examples of a notification include information notifying a user regarding changes to the building operations score over a particular timestamp interval, information indicating a building operations score is likely caused by a problem that requires addressing, and the like.

Example Systems of the Disclosure

FIG. 1 illustrates a block diagram of a system that may be specially configured within which embodiments of the present disclosure may operate. Specifically, FIG. 1 depicts an example system 100. The example system 100 includes the client device 104, monitored building environment processing system 102, building monitoring datastore 116, external building data systems 106A and 106B (collectively "external building data system 106"), monitored building environment monitoring interface 114, and environment monitoring sensors 112A, 112B, and 112C (collectively—"environment monitoring sensors 112). One or more client devices, such as the client device 104, monitored building environment processing system 102, external building data systems 106, building monitoring datastore 116, monitored building environment monitoring interface 114, and/or environment monitoring sensors 112, are each communicable with one or more other communication channels, for example embodied by the communications network 108. It should be appreciated that, in at least some embodiments, one or more component devices of the system 100 is/are optional. For example, in some embodiments, one or more optional component devices is not included. For purposes of illustration, optional components are depicted utilizing dashed (or "broken") lines.

As illustrated, the system 100 includes a plurality of monitored building environments (collectively "monitored building environments 110") within each of which one or more environment monitoring sensors are positioned. Specifically, as depicted, the system 100 includes a first monitored building environment 110A including a first set of environment monitoring sensors 112A, a second monitored building environment 110B including a second set of environment monitoring sensors 112B, and a third monitored building environment 110C including a third set of environment monitoring sensors 112C. In this regard, each of the environment monitoring sensors 112 is configured to enable collection of building monitoring data associated with the corresponding monitored building environment of the monitored building environments 110. For example, each of the environment monitoring sensors 112 may intake data from within one of the monitored building environments 110 that represents building monitoring data and/or processes such data to determine building monitoring data for the associated monitored building environment.

The building monitoring data for each monitored building environment of the monitored building environments 110 is communicable to one or more other computing devices and/or stored by one or more computing devices. For example, in some embodiments, each of the environment monitoring sensors 112 communicates building monitoring data to the monitored building environment processing system 102 for processing. In this regard, in some embodiments, the building monitoring data is transmitted from each of the environment monitoring sensors 112 directly or indirectly to the monitored building environment processing system 102. For example, in some embodiments, the environment monitoring sensors 112 each transmit building monitoring data directly to the monitored building environment processing system 102. In other embodiments, the environment monitoring sensors 112 each transmit building monitoring data to the monitored building environment monitoring interface 114.

The monitored building environment monitoring interface 114 comprises one or more computing devices embodied in hardware, software, firmware, and/or a combination thereof, that aggregates building monitoring data for any number of monitored building environments 110. In some embodiments, the monitored building environment monitoring interface 114 stores such building monitoring data and/or preprocesses the collected building monitoring data for further transmittal and/or use. Additionally or alternatively, in some embodiments, the building monitoring interface 114 is positioned within one or more of the monitored building environments 110. Alternatively or additionally, in other embodiments, the building monitoring interface 114 is positioned remote from each of the monitored building environments 110, for example in a centralized monitoring environment. In yet other embodiments, the monitored building environment monitoring interface 114 comprises one or more sub-interfaces within and/or proximate to each of the monitored building environments 110. For example, in an example context where the monitored building environment represents a particular building or a portion thereof, a particular sub-interface of the monitored building environment monitoring interface 114 is includes one or more computing devices embodied in hardware, software, firmware, and/or a combination thereof, that is positioned within a data warehouse and/or office environment of the monitored building environment. In this regard, each of the sub-interfaces alone and/or in combination embody the monitored building environment monitoring interface 114 operating in conjunction. In some embodiments, a single monitored building environment monitoring interface 114 is located in a cloud environment with respect to one or more of the monitored building environments from which it receives data.

In yet some other embodiments, the environment monitoring sensors 112 provide building monitoring data for storage in the building monitoring datastore 116. For example, in some embodiments, each of the environment monitoring sensors 112 provide building monitoring data directly to the building monitoring datastore 116. In other embodiments, the building monitoring data is provided indirectly through the monitored building environment monitoring interface 114 and/or the monitored building environment processing system 102. The building monitoring datastore 116 may store the building monitoring data and/or information derived therefrom alone and/or stored together with data identifying the monitored building environment corresponding to the monitored building environment. In some embodiments, the building monitoring datastore 116 is positioned at a same location or proximate to the monitored building environment processing system 102, and/or is embodied by a cloud datastore remote from the monitored building environment processing system 102, monitored building environments 110, and/or monitored building environment monitoring interface 114. Alternatively or additionally, in some embodiments, the building monitoring datastore 116 is embodied by a plurality of sub-datastores, for example a datastore associated with each of the monitored building environments 110.

In some embodiments, the monitored building environment processing system 102 receives building monitoring data in real-time for one or more of the monitored building environments 110. In some such embodiments, the monitored building environment processing system 102 processes the building monitoring data for any of a myriad of purposes, for example to generate one or more score(s) described herein. In some embodiments, additionally or alternatively, the monitored building environment processing system 102 stores a historical record of the building monitoring data in one or more datastores for subsequent processing. For example, in some embodiments, the monitored building environment processing system 102 stores a historical record embodying the building monitoring data together with a timestamp indicating a datetime at which the building monitoring data was captured and/or received. In some embodiments, such historical records are stored in the monitored building environment processing system 102 and/or an associated building monitoring datastore 116. In some embodiments, the stored historical records embodying the building monitoring data are retrieved at a subsequent time for purposes of further processing, for example to generate one or more score(s) as described herein. In this regard, the historical records and/or received data may both represent objective data values received in real-time with respect to the time they were collected.

In some embodiments, the monitored building environment processing system 102 is configured to process external and/or third-party data not collected via the environment monitoring sensors 112 within the monitored building environments 110. For example, in some embodiments, the monitored building environment processing system 102 communicates with and/or processes data retrieved from one or more external building data systems, such as the external building data system 106A and/or 106B (collectively "external building data systems 106"). Each of the external building data systems 106 may include one or more computing devices embodied in hardware, software, firmware, and/or a combination thereof, that collects, aggregates, and/or stores such third-party data for processing. Such third-party data stored by one or more of the external building data systems 106 may include survey data associated with each of the monitored building environments 110, industry data associated with monitored building environments of various monitored building environment types, and/or the other data relevant to analyzing the operational health and/or financial health of a monitored building environment. In some embodiments, one or more of the external building data systems 106 is/are controlled, owned, and/or otherwise operated by the same entity than the entity that controls, owns, and/or otherwise operates the monitored building environment processing system 102 and/or the monitored building environments 110. In other embodiments, one or more of the external building data systems 106 is/are controlled, owned, and/or otherwise operated by a different entity than the entity that controls, owns, and/or otherwise operates the monitored building environment processing system 102 and/or the monitored building environments 110.

The monitored building environment processing system 102 is configured to process data from the one or more data sources, for example building monitored data obtained directly or indirectly from the environment monitoring sensors 112 and/or the external building data systems 106. For example, in some embodiments, the monitored building environment processing system 102 processes data to determine, for one or more monitored building environments 110, one or more building operations scores for one or more building operations metrics, one or more corresponding building operations financial scores for one or more building operations metrics, one or more overall building operational score, and/or one or more overall building financial score. Additionally or alternatively, in some embodiments, the monitored building environment processing system 102 performs one or more other processes for building score generation, classification, and/or the like. Additionally or alternatively still, in some embodiments, the monitored building environment processing system 102 configures and/or provides data to cause rendering of one or more customized configured user interfaces, such as one or more dashboards as described herein.

In some embodiments, the monitored building environment processing system 102 includes one or more components embodied in a cloud environment with respect to each of the monitored building environments 110 and/or the client device 104. For example, in some embodiments, the monitored building environment processing system 102 includes at least one processor and/or at least one memory device positioned in one or more cloud environments. In this regard, in some embodiments, the monitored building environment processing system 102 includes such processor(s) and/or memory device(s) in a remote location from the monitored building environments 110, and/or in some embodiments from another, such that the cloud processor(s) and/or cloud memory device(s) are communicable over one or more communication networks. It should be appreciated that, in some embodiments, the devices located in the cloud environment are nevertheless configured to work in conjunction with one another to provide a consistent user experience and/or functionality access. In yet other embodiments, the monitored building environment processing system 102 is positioned in a monitored building environment, for example one or more of the monitored building environments 110. Alternatively or additionally, in some embodiments, each monitored building environment includes a monitored building environment processing system 102.

The client device 104 includes one or more computing devices embodied in hardware, software, firmware, and/or a combination thereof, that enables access to functionality provided by the monitored building environment processing system 102. In some embodiments, the client device 104 comprises a user device under the control of a particular user and/or entity that owns, operates, and/or otherwise desires to analyze aspects of the monitored building environments 110. For example, in some embodiments, the client device 104 is embodied by a user's mobile device accessing one or more software applications that provide access to the functionality of the monitored building environment processing system 102 as described herein. In some embodiments, the client device 104 is configured to execute a native software application that provides access to such functionality, for example an "app" installed to the client device 104 and executed by the user. In other embodiments, the client device 104 is configured to execute a web-based software application that provides access to such functionality via a browser application installed and/or executing on the client device 104. It should be appreciated that, in some embodiments, the client device 104 communicates with the monitored building environment processing system 102 over one or more communication networks to enable access to such functionality. For example, in some embodiments, the client device 104 communicates with the monitored building environment processing system 102 via the communications network 108 and/or another communications network to enable transmission of requests to the monitored building environment processing system 102, and/or response data from the monitored building environment processing system 102, to facilitate access to such functionality.

In some embodiments, the client device 104 communicates with the monitored building environment processing system 102 to establish an authenticated session that enables access to various functionality associated with the monitored building environment processing system 102. For example, in some embodiments, the client device 104 establishes an authenticated session with the monitored building environment processing system 102 to access data provided by certain building monitoring data associated with the particular monitored building environments of the monitored building environments 110 and/or particular external building data associated with the particular monitored building environments of the monitored building environments 110. In some embodiments, for example, a user utilizes the client device 104 to provide user authentication credentials linked to a particular user account maintained by the monitored building environment processing system 102. In this regard, in some embodiments, the user of the user device 104 authenticates a particular user account (e.g., associated with a provisioned user data object maintained by the monitored building environment processing system 102) to initiate an authenticated session associated with the particular user account, and thus accessing data associated with the particular user account. For example, in a context where monitored building environments 110A and 110B have been associated with a particular user account, and an authenticated session associated with the particular user account has been established via the user device 104, the user may utilize the user device 104 to access building monitoring data from the environment monitoring sensors 112A and 112B, third-party and/or external data provided by the external building data systems 106 that are associated with the monitored building environments 110A and/or 110B, and/or processed data or functionality associated therewith (e.g., building operations scores, overall building operational scores, building operations financial scores, and/or overall building financial scores). Alternatively, in a context where monitored building environment 110C has been associated with a particular user account, and an authenticated session associated with the particular user account has been established via the user device 104, the user may utilize the user device 104 to access building monitoring data from the environment monitoring sensors 112C, third-party and/or external data provided by the external building data systems 106 that are associated with the monitored building environment 110C, and/or processed data or functionality associated therewith. In this regard, it should be appreciated that different users (e.g., who authenticate different user accounts associated with different user data objects) may be provided access to different data and/or functionality via the monitored building environment processing system 102.

In some embodiments, the client device 104 enables the user to access particular functionality and/or data via user interfaces rendered to the client device 104 via communication with the monitored building environment processing system 102. For example, in some embodiments, the monitored building environment processing system 102 communicates with the client device 104 to cause rendering of one or more user interface dashboards that include building operations score(s), building operations financial score(s), overall building operational score(s), overall building financial score(s), and/or information associated therewith including, for example, monitored building environment classification(s), monitored building environment type(s), location information, and/or the like. In some embodiments, such user interface dashboard(s) is/are rendered including user interface elements that enable interaction with the data, for example sorting, filtering, and/or other view manipulation. Additionally or alternatively, in some embodiments, the user interface dashboard provides user interface elements for accessing additional functionality associated with the rendered data, for example to enable portfolio-level processing of such data associated with a plurality of associated monitored building environments.

Additionally or alternatively, in some embodiments, different user accounts have access to different functionality provided by the monitored building environment processing system 102. For example, in some embodiments, a user account enables access to view and/or generate one or more scores (e.g., building operations score(s), building operations financial score(s), overall building operational score(s), and/or overall building financial score(s)), but not configure the weights and/or predefined algorithms utilized to generate such scores. Additionally or alternatively, in some embodiments, certain user account(s) enable access to configuring the predefined algorithms utilized to generate such scores and/or weights associated therewith. In some embodiments, access to functionality is provided based on role(s) assigned to the user account, where each role is enabled access to specific functionality.

The communications network 108 may embody any of a number of public and/or private networks enabling communication between various computing devices. For example, in some embodiments, the communications network 108 includes and/or is embodied by one or more network access device(s), cell tower(s), base station(s), network base station(s), wired and/or wireless connection tower(s), signal booster(s), signal propagation device(s), and/or the like. Each of the devices and/or systems described with respect to the system 100 may access the communications network 108 utilizing any of a myriad of transmission protocols and/or corresponding communications circuitry enabling transmission of specially configured transmissions based on the transmission protocol. A non-limiting example of the communications network 108 includes the Internet, and/or one or more hybrid networks enabling access to the Internet. It should be appreciated that, in some embodiments, the communications network 108 includes one or more sub-networks that facilitate communications between discrete devices of the system 100. For example, in some embodiments, the communications network 108 includes a sub-network that facilitates communication between the monitored building environment processing system 102 and the external building data systems 106 and/or building monitoring datastore 116, and a second sub-network that facilitates communication between the monitored building environment processing system 102 and the monitored building environment monitoring interface 114 and/or environment monitoring sensors 112. Each sub-network in some embodiments includes entirely distinct components. In other embodiments, one or more sub-networks include one or more shared components that facilitate such communications.

Example Apparatuses of the Disclosure

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In at least one example embodiment, the monitored building environment processing system 102 is embodied by one or more computing systems, such as the apparatus 200 as shown in FIG. 2. The apparatus 200, as depicted, includes a processor, memory 204, input/output circuitry 206, communications circuitry 208, operations scoring circuitry 210, and/or financial scoring circuitry 212. Although the components are described with respect to functional limitations, it should be understood that the particular implementations necessarily include the use of particular hardware. It should also be understood that certain of the components described herein in some embodiments include similar or common hardware. For example, in some embodiments two sets of circuitry both leverage use of the same processor, network interface, storage medium, or the like to perform their associated functions, such that duplicate hardware is not required for each set of circuitry. The use of the term "circuitry" as used herein with respect to components of the apparatus 200 should therefore be understood to include particular hardware configured to perform the functions associated with the particular set of circuitry as described herein.

Additionally or alternatively, the term "circuitry" should be understood broadly to include hardware and, in some embodiments, software and/or firmware for configuring the hardware. For example, in some embodiments, "circuitry" refers to and/or includes processing circuitry, storage media, network interfaces, input/output devices, and the like. In some embodiments, other elements of the apparatus 200 provide or supplement the functionality of the particular circuitry. For example, in some embodiments the processor 202 provide processing functionality, the memory 204 provides storage functionality, the communications circuitry 208 provides network interface functionality, and the like, to one or more of the other sets of circuitry.

In some embodiments, the processor 202 (and/or co-processor or any other processing circuitry assisting or otherwise associated with the processor) is in communication with the memory 204 via a bus for passing information among components of the apparatus. The memory 204 is non-transitory and in some embodiments includes, for example, one or more volatile and/or non-volatile memories. In other words, for example in some embodiments, the memory embodies a non-transitory electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure. In some embodiments, for example, the memory 204 embodies one or more databases for storing user data objects, electronic data objects, and/or other data associated therewith, and/or otherwise is configured to maintain such data objects for accessing and/or updating as described herein.

In various embodiments of the present disclosure, the processor 202 is embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 is configured to execute computer-coded instructions stored in the memory 204 or otherwise accessible to the processor. Alternatively, or additionally, in some embodiments, the processor 202 is configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively or additionally, in another example context, when the processor is embodied as an executor of software instructions, the instructions specifically configure the processor 202 to perform the algorithms and/or operations described herein when the instructions are executed.

As one example context, the processor 202 is configured to support monitored building environment data collection and/or processing functionality. In some such embodiments, for example, the processor 202 is configured to receive, retrieve, and/or otherwise collect building monitoring data from one or more environment monitoring sensors positioned in at least one monitored building environment, determine for the at least one monitored building environment a building operation score set corresponding to a building operations metric set based on the building monitoring data for the at least one monitored building environment, and/or determine an overall building operational score associated with the at least one monitored building environment. Additionally or alternatively, in some embodiments, the processor 202 is configured to receive building system financial data for the at least one monitored building environment and generate a building operations financial score set and/or corresponding building financial scores set for the processor 202. Additionally or alternatively, in some embodiments, the processor 202 is configured to determine portfolio-level scores, such as a portfolio overall building operational score for a plurality of associated monitored building environments and/or a portfolio building financial score for the plurality of associated monitored building environments. Alternatively or additionally, in some embodiments, the processor 202 is configured to categorize one or more monitored building environment(s) based on associated data and/or scores derived therefrom. Additionally or alternatively, in some embodiments, the processor 202 is configured to determine a notification action associated with a monitored building environment and/or a building operations metric and/or provide information associated with the notification action. Additionally or alternatively, in some embodiments, the processor 202 is configured to cause rendering of a user interface dashboard comprising various data values and/or data processed therefrom.

In some embodiments, the apparatus 200 includes input/output circuitry 206 that, alone or in communication with processor 202, provides output to the user and/or receives indication(s) of user input. In some embodiments, the input/output circuitry 206 comprises one or more user interfaces, and/or includes a display to which user interface(s) may be rendered. In some embodiments, the input/output circuitry 206 comprises a web user interface, a mobile application, a desktop application, a linked or networked client device, and/or the like. In some embodiments, the input/output circuitry 206 also includes any of a number of peripherals, a keyboard, a mouse, a joystick, a touch screen, touch areas, soft keys, a microphone, a speaker, or other input/output mechanisms. In some such embodiments, the input/output mechanisms are configured to enable a user to provide data representing one or more user interaction(s) for processing by the apparatus 200. The processor and/or input/output circuitry 206 communicable with the processor, for example processor 202, is configured to control one or more functions of one or more user interface elements through computer program instructions (e.g., software and/or firmware) stored on a memory accessible to the processor (e.g., memory 204, and/or the like).

The communications circuitry 208 in embodied by any means such as a device or circuitry embodied in either hardware or a combination of hardware and software that is configured to receive and/or transmit data from/to a network and/or any other device, circuitry, or other module in communication with the apparatus 200. In this regard, the communications circuitry 208 includes, in some embodiments for example, at least a network interface for enabling communications with a wired or wireless communications network. For example, in some embodiments, the communications circuitry 208 includes one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The operations scoring circuitry 210 includes hardware, software, firmware, and/or a combination thereof, configured to support building operations score processing functionality associated with the monitored building environment processing system 102. The operations scoring circuitry 210 in some embodiments utilizes processing circuitry, such as the processor 202, to perform one or more of these actions. In some embodiments, the operations scoring circuitry 210 includes hardware, software, firmware, and/or a combination thereof, to generate building operations score(s) corresponding to particular building operations metric(s) from data obtained from one or more sources, such as building monitoring data, third-party data, and/or external data. Additionally or alternatively, in some embodiments, the operations scoring circuitry 210 includes hardware, software, firmware, and/or a combination thereof, to generate sub-metric score(s) for sub-metric(s) of building operations metric(s) based on data obtained from one or more sources, such as building monitoring data, third-party data, and/or external data. Additionally or alternatively, in some embodiments, the operations scoring circuitry 210 includes hardware, software, firmware, and/or a combination thereof, to determine building operational score(s) for one or more monitored building environment(s). Additionally or alternatively, in some embodiments, the operations scoring circuitry 210 includes hardware, software, firmware, and/or a combination thereof, to further process and/or cause rendering of any such data obtained and/or derived therefrom, for example for providing via a user interface dashboard, classifying one or more monitored building environments, ranking monitored building environment(s), and/or the like. It should be appreciated that, in some embodiments, the operations scoring circuitry 210 includes or is embodied by a separate processor, specially configured field programmable gate array (FPGA), and/or a specially configured application-specific integrated circuit (ASIC).

The financial scoring circuitry 212 includes hardware, software, firmware, and/or a combination thereof, configured to support building financial score processing functionality associated with the monitored building environment processing system 102. The financial scoring circuitry 212 in some embodiments utilizes processing circuitry, such as the processor 202, to perform one or more of these actions. In some embodiments, the financial scoring circuitry 212 includes hardware, software, firmware, and/or a combination thereof, to generate building operations financial score(s) corresponding to particular building operations metric(s) from data obtained from one or more sources, such as building monitoring data, third-party data, and/or external data. Additionally or alternatively, in some embodiments, the financial scoring circuitry 212 includes hardware, software, firmware, and/or a combination thereof, to generate sub-metric financial score(s) for sub-metric(s) of building operations metric(s) based on data obtained from one or more sources, such as building monitoring data, third-party data, and/or external data. Additionally or alternatively, in some embodiments, the financial scoring circuitry 212 includes hardware, software, firmware, and/or a combination thereof, to determine overall building financial score(s) for one or more monitored building environment(s). Additionally or alternatively, in some embodiments, the financial scoring circuitry 212 includes hardware, software, firmware, and/or a combination thereof, to further process and/or cause rendering of any such data obtained and/or derived therefrom, for example for providing via a user interface dashboard, classifying one or more monitored building environments, ranking monitored building environment(s), and/or the like. It should be appreciated that, in some embodiments, the financial scoring circuitry 212 includes or is embodied by a separate processor, specially configured field programmable gate array (FPGA), and/or a specially configured application-specific integrated circuit (ASIC).

In some embodiments, one or more of the aforementioned sets of circuitry are combined to form a single set of circuitry. The single combined set of circuitry may be configured to perform some or all of the functionality described herein with respect to the individual sets of circuitry. For example, in at least one embodiment, the operations scoring circuitry 210 and the financial scoring circuitry 212 are embodied by a single set of circuitry, and/or one or more of the operations scoring circuitry 210 and/or the financial scoring circuitry 212 are combined with the processor 202. Additionally or alternatively, in some embodiments, one or more of the sets of circuitry described herein is/are configured to perform one or more of the actions described with respect to one or more of the other sets of circuitry.

Example Computing Environment of the Disclosure

Having described some example systems and apparatuses in accordance with the present disclosure, example computing environments in accordance with the present disclosure are further described. It should be appreciated that the example computing environments may be maintained by any of the computing devices, apparatuses, systems, and/or the like as described. For example, in some embodiments, each computing environment is maintained as a software environment executed by specially configured hardware as described herein. In one or more particular example embodiments, the apparatus 200 maintains a software environment embodying the illustrated computing environments utilizing the various components of the apparatus 200 as described herein.

FIG. 3 illustrates example data values maintained as part of an example computing environment in accordance with at least some example embodiments of the present disclosure. Specifically, FIG. 3 illustrates various data values associated with scoring the operations of various aspects of a monitored building environment. In this regard, each of the data values depicted may be embodied by one or more data object(s) maintained by the apparatus 200 in a software computing environment implemented via the hardware described with respect to the apparatus 200.

As depicted, the apparatus 200 maintains building monitoring data 302. The building monitoring data, in some embodiments, includes data received and/or otherwise retrieved or collected from one or more environment monitoring sensor(s) positioned within a particular monitored building environment. For example, in some embodiments, the building monitoring data embodies real-time data associated with one or more aspects of the monitored building environment being monitored as measured by one or more environment monitoring sensor(s) within the monitored building environment. It should be appreciated that such data may include Additionally or alternatively, in some embodiments, the building monitoring data 302 includes third-party data and/or external data not received from an environment monitoring sensor positioned within the particular monitored building environment. Such external data and/or third-party data includes, in some contexts, financial information associated with the monitored building environment and/or other monitored building environment(s), survey data from operators of the monitored building environment and/or other monitored building environment(s), survey data from tenants and/or other persons that utilize or interact with the monitored building environment(s), and/or the like. Such data in some embodiments is retrieved from any of a number of external building data systems, such as commercial datastores and/or aggregators, governmental agency systems, utility service systems, and/or the like. It should be appreciated that the building monitoring data in some embodiments includes various different sub-portions of data, for example both real-time received data from environment monitoring sensor(s) and third-party data and/or external data from external building data system(s).

The computing environment further includes a plurality of building operations metrics 306A-306E (collectively "building operations metric set 306"). The building operations metric set 306 in some embodiments defines different categories by a particular monitored building environment may be scored. For example, as depicted, the building operations metric 306 includes a people metric, a process metric, an assets metric, a connectivity metric, and an environment metric. Each of these metrics represents a data-driven analysis of a particular aspect of the monitored building environment, and in some embodiments corresponds to a particular building operations score that represents how data associated with a particular monitored building environment meets a desirable outcome with respect to the aspect represented by the metric as determined from some or all of the building monitoring data 302. For example, the people metric and corresponding building operations score represent an overall objective of improving the wellness of occupants within the monitored building environment, minimizing the negative impact of the monitored building environment on an individual's wellness, happiness, and/or productivity. The assets metric and corresponding building operations score represents an overall objective of improving the health, efficiency, and/or life of the monitored building environment and/or associated sub-assets (e.g., including equipment of the monitored building environment and/or infrastructure of the monitored building environment). The process metric and corresponding building operations score represents an overall objective of improving the efficiency of processes that are in place to manage, operate, and/or secure the monitored building environment. The environment metric and corresponding building operations score represents an overall objective to minimize the negative impact the building has on the local or global environment. The connectivity metric and corresponding building operations score represents an overall objective of improving the continuity and security of the flow of information within a monitored building environment and the flow of such data to external systems, devices, and/or the like for purposes of further processing and/or analysis. In this regard, for each of these building operations metrics, a corresponding building operations score is determinable that represents how well the particular monitored building environment is accomplishing the aspect represented by the corresponding building operations metric. It should be appreciated that, in other embodiments, other building operations metrics representing any of a myriad of aspects associated with a particular monitored building environment may be designed.

In some embodiments, one or more building operations metrics are associated with one or more building operations sub-metrics (or "sub-metrics") that represent sub-categories of a particular building operations metric by which a particular monitored building environment may be scored. For example, in this regard, a building operations metric in some embodiments comprises any number of sub-metrics representing any number of sub-categories utilized to determine how well a monitored building environment is accomplishing the corresponding building operations metric overall. As illustrated, building operations metric 306A (the people metric) corresponds to the sub-metric set 304A, specifically including a safety and security sub-metric, an accessibility sub-metric, a productivity sub-metric, an awareness sub-metric, and a comfort satisfaction sub-metric. Similarly, the building operations metric 306B (the process metric) corresponds to the sub-metric set 304B, specifically including a maintenance sub-metric, an operations sub-metric, a customer service sub-metric, and an innovation sub-metric. The building operations metric 306C corresponds to the sub-metric set 304C, the building operations metric 306D corresponds to the sub-metric set 304D, and the building operations metric 306E corresponds to the sub-metric set 306E. In some embodiments, it should be appreciated that a sub-metric set for a particular building operations metric may include any number of sub-metrics as desired.

In some such embodiments, the apparatus 200 determines a building operations sub-metric score associated with each building operations sub-metric for a particular building operations metric. In this regard, each building operations sub-metric score represents how well the particular monitored building environment is accomplishing the aspect represented by the corresponding building operations sub-metric. For example, the building operations score corresponding to the safety and security sub-metric of the building operations sub-metric set 304A in some embodiments represents how well the monitored building environment is meeting desired levels of safety and security for occupants, while the building operations score corresponding to the maintenance building operations sub-metric of the building operations sub-metric set 304B in some embodiments represents how well the monitored building environment is meeting desired standards for maintenance of different building systems and/or components.

It should be appreciated that the building operations score for each building operations sub-metric is also determinable from some or all of the building monitoring data 302. For example, in some embodiments, one or more data values associated with a metric is determinable from the building monitoring data 302. In some embodiments, the data properties associated with the metric are then utilized to generate the building operations score and/or one or more sub-scores for the building operations sub-metric. For example in some embodiments, the apparatus 200 maintains a look-up table that includes data properties to be determined from or embodied by building monitoring data 302, and/or a look-up table that includes scoring values for such each of the data properties that are utilized in converting from the data value for each data property to the building operations score for the sub-metric and/or metric. In some such embodiments, the look-up table includes data values and/or ranges of data values for a data property that is utilized to determine a building operations score for a building operations sub-metric based on the data value for a particular property. For example, in some embodiments, to determine a building operations score for a particular building operations sub-metric, the apparatus 200 processes building monitoring data to determines a plurality of data values representing certain properties, and utilizes the look-up table to generate a sub-score corresponding to each data value for each data property, then sums the sub-scores to generate the building operations score for the building operations sub-metric. Non-limiting examples of data properties for which a data value is determinable from building monitoring data are described herein with respect to FIG. 4.

Additionally or alternatively, in some embodiments, different portions of data are utilized to generate a building operations score for a particular sub-metric. For example, in some embodiments, the building operations score associated with a first building operations sub-metric is determined from a first portion of building monitoring data, such as building monitoring data obtained from at least a first environment monitoring sensor positioned within the monitored building environment, and the building operations score associated with a second building operations sub-metric is determined from a second portion of building monitoring data, such as building monitoring data obtained from at least a second environment monitoring sensor positioned within the monitored building environment. In one example context, a first building operations score corresponding to the comfort satisfaction sub-metric is determinable based on a portion of the building monitoring data 302 received from an air quality monitoring system, HVAC system, and/or other health related systems positioned in the monitored building environment, while a second building operations score corresponding to the utilities consumption sub-metric is determinable based on a second portion of the building monitoring data 302 received from a water utility system, a gas utility system, an electricity utility system, and/or the like positioned within the monitored building environment. It should be appreciated that, in some embodiments the particular building monitoring data utilized to generate a building operations score is determinable for a particular metric. For example, in some embodiments, each sub-metric is associated with particular building monitoring data from particular sources that collect, process, and/or otherwise generate building monitoring data of a particular type that is associated with the overall aspect represented by the building operations metric and/or sub-metric.

In some embodiments, the building operations scores associated with various building operations sub-metrics of a particular building operations metric are utilized to determine the building operations score for the building operations metric. For example, as depicted, the building operations sub-metric set 304A includes sub-metrics utilized to determine and/or otherwise generate the building operations metric 306A. Similarly, the building operations sub-metric set 304B includes sub-metrics utilized to determine and/or otherwise generate the building operations metric 306B, and so on. In this regard, the building operations score for each of the building operations sub-metrics is utilized to determine the building operations score for the associated building operations metric. For example, in some embodiments, the apparatus 200 is configured to apply the building operations score for each of the sub-metrics to a predefined algorithm that outputs the building operation score for the building operations metric corresponding to the sub-metrics. In some embodiments, for example, the building operations score for the building operations metric is determined utilizing a weighted average of the building operation scores for each of the sub-metrics, where the weight to be applied to each sub-metric is user-determined and/or set, determined by the apparatus 200, and/or predetermined.

In some embodiments, as depicted, the building operations metric set 306 is utilized to determine an overall building operational score 308. In some embodiments, the overall building operational score 308 represents an overall metric for how well the monitored building environment accomplishes all of the aspects represented by the various building operations metrics of the building operations metric set 306. In this regard, the overall building operational score 308 provides a single metric that provides a high-level understanding of how well a particular monitored building environment functions based on the considerations that are identified as important to a user, for example as defined by the various metrics of the business operations metric set 306. In some embodiments, the overall building operational score 308 is determined from the building operations score set corresponding to the building operations metrics 306, for example based on a predefined algorithm. It should be appreciated that in some embodiments the predefined algorithm for determining each building operations score for each of the building operations metric based on the building operations scores corresponding to each building operations sub-metric of a building operations sub-metric set of the building metric sets 304A-304E are different from one another, and/or are each different from the predefined algorithm for determining an overall building operational score for the monitored building environment based on the building operations scores for each building operations metric of the building operations metric set 306.

In some embodiments, the apparatus 200 is configured to determine the improvement(s) to one or more building operations score for a building operations sub-metric that would result in improvements of the building operations score for the corresponding building operations metric, and/or determines the improvement(s) to one or more data values for a data property utilized in calculating the building operations score for a particular building operations sub-metric that would result in improvements of the building operations score for the building operations sub-metric. In this regard, changes to the operations of the monitored building environment that result in such improvements subsequently would enable the corresponding scores to improve. In this regard, the apparatus 200 in some embodiments provides such information as a notification action, for example a recommendation, renderable and/or otherwise presented to a user via a user interface. By determining and presenting such notification action information, the user may perform corresponding actions to improve such measured data values. Such actions would result in improved score(s) generated from subsequent building monitoring data upon performing the actions resulting in the improvement. It should be appreciated that the apparatus 200 in some embodiments determines such improvement(s) to be made based on the predefined algorithm utilized to generate one or more score(s), and/or the building monitoring data utilized in generating the most recent score. For example, in some embodiments, the apparatus 200 determines how much one or more data values for a particular data property (or data properties) is to improve to result in a particular change in a corresponding determined score.

Utilizing the particular building operations metrics, a particular monitored building environment (or plurality of monitored building environments) can be analyzed on key objectives determined to be of importance for the particular monitored building environment(s). Further, by determining an overall building operational score, the monitored building environment can be analyzed quickly based on a single metric. In this regard, utilizing the building operational score, building operations scores for each building operation metric, and/or further the building operations scores for each building operation sub-metric, a monitored building environment similarly can be analyzed at various granular levels. In this regard, in some embodiments, the more granular scores can be further processed to determine one or more building operations metrics and/or one or more building operations sub-metrics that can be improved to improve the building operations score for a particular building operations metric and/or the overall building operational score. In this manner, similarly, the building operations sub-metric that would have the largest impact on improving the corresponding building operations metric if improved, and/or the building operations metric that would have the largest impact on improving the corresponding overall building operational score if improved, is determinable at any level of granularity desired. Further, such determinations can be updated in real-time based on updates represented in the building monitoring data 302 collected from various environment monitoring sensors positioned within the monitored building environment.

FIG. 4 illustrates example data properties maintained as part of an example computing environment in accordance with at least some example embodiments of the present disclosure. Specifically, FIG. 4 illustrates various data properties for which data values may be determined from building monitoring data for use in determining one or more building operations scores, for example building operations score(s) for one or more building operations metrics and/or sub-metrics. In this regard, it should be appreciated that in some embodiments the building monitoring data includes one or more raw data values utilized in determining a building operations score without further processing, for example such that building monitoring data is processed as received directly from one or more environment monitoring sensors positioned within a monitored building environment.

As depicted, the building monitoring data 302 is utilized to identify various values for data properties utilized in determining different building operations metrics and/or sub-metrics. For example, in some embodiments as depicted, the building monitoring data 302 is utilized to determine a first set of data values for the data properties 402A utilized in generating the building operations score for first building operations metric—for example the people metric as depicted. In this regard, for example, at least a portion of the building monitoring data 302 is processed to determine a comfort score, a second portion of the building monitoring data 302 is processed to determine a number of safety and security incidents, a third portion of the building monitoring data 302 is processed to determine an information access value, and a fourth portion of data is processed to determine a happiness index value. Further, in some embodiments, the building monitoring data is utilized to identify a second set of data values for the data properties 402B utilized in generating the building operations score for a second building operations metric—for example the process metric as depicted. In this regard, for example, at least a portion of the building monitoring data 302 is processed to determine a mean time to repair value, and a second portion of the building monitoring data 302 is processed to determine a number of maintenance predictions and preventions value. Similarly, the building monitoring data 302 may be utilized to determine any number of other data values associated with any of the data properties 402C, 402D, and/or 402E.

It should be appreciated that a particular portion of the building monitoring data 302 may be utilized to generate any number of data values for any number of data properties. For example, in some embodiments, a single environment monitoring sensor positioned in a monitored building environment provides raw data embodied in the building monitoring data 302 is utilized to determine a first data value and a second data value that are subsequently utilized in determining a building operations score (e.g., for a particular building operations sub-metric utilizing a predetermined algorithm). It should be appreciated that, in some embodiments, the apparatus 200 weights various data values identified from the building monitoring data utilizing different weights to generate the corresponding building operations score for a particular building operations sub-metric.

In some embodiments, the building monitoring data 302 is utilized to determine a data value for a particular data property based on corresponding benchmark data for that data property and/or one or more other data properties. For example, in some embodiments, the building monitoring data 302 is processed to determine a raw data value for a particular data property (e.g., a raw data value indicating a utility consumption amount, for example). In some such embodiments, the raw data value is determined for any of a myriad of timestamp intervals (e.g., on a rolling basis, every month, and/or the like) as predetermined, configured by a user, and/or the like. In some embodiments, the raw data value is then utilized to determine a corresponding a percentile data value based on benchmark data associated with the data property. The benchmark data utilized may be specifically associated with a particular monitored building environment type, such that different classes of monitored building environments are appropriately benchmarked against one another. In some such embodiments, for example, one or more historical records of the benchmark data is/are processed to determine a mean, or median, and standard deviation that are utilized to determine a corresponding percentile data value corresponding to the raw data value. Alternatively or additionally, in some embodiments, a benchmark curve is derived from the benchmark data, for example in embodiments where the benchmark data includes a median and a standard deviation for a particular data property. A derived benchmark curve may then be used to determine a percentile data value for the raw data value associated with a particular data property. In some such embodiments, the percentile data value embodies as the determined data value for the data property, and/or is subsequently utilized to determine the data value therefrom.

In one example context, building monitoring data 302 and corresponding benchmark data in some embodiments are utilized to determine a data value for each of several types of utility consumption associated with a particular monitored building environment. For example, in some embodiments, data values for electric consumption, water consumption, and gas consumption are determined. In some such embodiment, benchmark data is receive that includes, or includes data that is utilized to derive, a median value for electric consumption and a standard deviation for electric consumption, a median value for water consumption and a standard deviation for water consumption, and a median value for gas consumption and a standard deviation for gas consumption. The median value for electric consumption and the standard deviation for electric consumption are utilized to derive a benchmark curve for electric consumption. A raw data value for electric consumption is determinable from the building monitoring data 302. The raw data value for electric consumption is applied to the derived benchmark curve for electric consumption to determine the percentile value for electric consumption, which represents the determined data value for the particular data property of electric consumption. Determined data value(s) for water consumption and gas consumption data properties are determinable in a similar manner, for example by deriving a benchmark curve for water consumption and a benchmark curve for gas consumption, respectively, and applying a raw data value for water consumption to the benchmark curve for water consumption and applying a raw data value for gas consumption to the benchmark curve for gas consumption to determine percentile values thereof. For some data properties, the percentile data value represents the determined data value for the corresponding data property. For other data properties, for example data properties that represent an inverse score relationship (e.g., a lower score is preferred) such as utility consumption, the percentile data value is inverted to determine an accurate percentile value that represents a determined data value for the corresponding data property. The percentile data value may be inverted by subtracting the percentile data value from 100 in some contexts using percentage percentile values and/or subtracting the percentile data value from 1 for normalized percentile values, and/or the like.

Each of these determined data values be utilized as a building operations score, in some embodiments, and/or utilized together with other determined data values to determine a building operations score. For example, in some embodiments, the determined data values are utilized to determine a building operations score by taking a simple average of the various percentile data values. In other embodiments, the determined data values are utilized to determine a building operations score by taking a weighted average of the various percentile data values, for example based on determinable weights, predefined weights, user-defined weights, and/or the like. In other embodiments, another predefined function is utilized to determine a building operations score from various determined data values based on building monitoring data and/or benchmark data. Use of benchmark data for benchmark curve derivation, and subsequent use of the benchmark curve, is further described herein with respect to FIG. 8.

Additionally or alternatively, in some embodiments, the apparatus 200 determines one or more financial scores associated with a particular monitored building environment, or multiple monitored building environments. FIG. 5, for example, illustrates example data values maintained as part of an example computing environment in accordance with at least some example embodiments of the present disclosure. In some embodiments, the data values are maintained as part of shared computing environment together with that described herein with respect to FIGS. 3 and/or 4, such as a computing environment maintained by a single software application and/or process executed on and/or embodied by the apparatus 200.

As depicted, the apparatus 200 maintains the building system financial data 502. In some embodiments, the building system financial data 502 includes data received and/or otherwise retrieved associated with generating a building operations financial score associated with one or more building operations metrics. In some embodiments, at least some building system financial data is received directly from environment monitoring sensors positioned in and/or associated with the monitored building environment. For example, in some embodiments, the apparatus 200 communicates with a smart utility system that provides one or more utilities to the monitored building environment (e.g., an electricity utility system) to retrieve the current cost of consumption for the utility provided by the smart utility system (e.g., a dollar rate per kilowatt-hour). Alternatively or additionally, in some embodiments, the building system financial data includes a consumed rate, for example that is combinable with the cost of consumption data to determine a cost of utilities consumed. Additionally or alternatively, in some embodiments, the apparatus 200 communicates with one or more external and/or third-party data sources that are not positioned in and/or otherwise interact with a monitored building environment to receive and/or otherwise identify building system financial data associated with the monitored building environment. For example, in some embodiments, the apparatus 200 interacts with a central utility system (e.g., a core server operated by and/or otherwise associated with a local utility company) to request such building system financial data associated with a particular monitored building environment (e.g., by sending an address, or other unique identifier that identifies a particular monitored building environment, for example). It should be appreciated that, in some embodiments, at least a portion of the building system financial data 502 is identified in real-time (e.g., a current rate for utilities consumption of a particular monitored building environment), and in other circumstances at least a portion of the building system financial data 502 is stored at later retrieved (e.g., survey data, static data, and/or the like retrieved from one or more commercial, third-party, or otherwise available data systems).

The computing environment further includes a plurality of building operations financial metrics 506A-506E (collectively "building operations financial metrics set 506"). The building operations financial metrics set 506 in some embodiments defines different financial categories by which a particular monitored building environment may be scored. In some embodiments, the building operations financial metrics of the building operations financial metrics set 506 correspond to building operations metrics of the building operations metric set 306 as described above with respect to FIG. 3. For example in an example context, the building operations financial metric 506A represents a people financial metric (e.g., representing a financial impact and/or health of the people metric represented by building operations metric 306A), the building operations financial metric 506b represents a process financial metric (e.g., representing a financial impact and/or health of the process metric represented by building operations metric 306B), the building operations financial metric 506C represents an assets financial metric (e.g., representing a financial impact and/or health of the asset metric represented by building operations metric 306C), the building operations financial metric 506D represents a connectivity financial metric (e.g., representing a financial impact and/or health of the connectivity metric represented by building operations metric 306D), and the building operations financial metric 506e represents an environment financial metric (e.g., representing a financial impact and/or health of the environment metric represented by building operations metric 306E). In this regard, the building operations financial scores corresponding to each of these metrics represents a data-driven analysis of a particular financial aspect of the operations of a particular monitored building environment.

In some embodiments, the building operations financial metrics each correspond to a building operations financial score that represents how well the operations of the monitored building environment are meeting desired financial outcomes with respect to the aspect represented by the corresponding building operations financial metric. In this regard, the building operations financial score for each building operations financial metric in some embodiments is determinable at least based on a portion of the building system financial data 502. Alternatively or additionally, in some embodiments, the building operations financial data is determinable based on the building operations score for each of the building operations metrics 506, alone or in combination with the building system financial data 502. For example, in some embodiments, the building operations score for a particular building operations metric 306A is utilized in a predefined algorithm (e.g., together with building systems financial data 502 and/or a portion thereof) to determine a corresponding building operations financial score for a building operations financial metric 506A corresponding to the building operations metric 306A. In this regard, it should be appreciated that, in at least some embodiments, a building operations financial score for a particular metric is determinable based on a combination of building monitoring data 302 and building systems financial data 502.

In some embodiments, a particular building operations financial metric is associated with one or more building operations financial sub-metrics that represent sub-categories of a particular building operations financial metric. In some embodiments, for example, a building operations financial metric corresponding to a particular building operations metric is associated with building operations financial sub-metrics that correspond to each of the building operations sub-metrics associated with the particular building operations metrics. For example, as depicted, the building operations metric 306A is associated with a building operations sub-metric set 304A, and the building operations financial metric 506A (that corresponds to the building operations metric 306A) is associated with a building operations financial sub-metric set 504A, which includes a building operations financial sub-metric mapped to each building operations sub-metric of the set 306A. Similarly, the building operations metric 306B is associated with a building operations sub-metric set 304B, and the building operations financial metric 506B (that corresponds to the building operations metric 306B) is associated with a building operations sub-metric set 504B, which includes a building operations financial sub-metric mapped to each building operations sub-metric of the set 306B. The remaining building operations financial metrics are similarly mapped for each of the building financial sub-metrics in the set 506.

In some such embodiments, the building operations financial score for a building financial sub-metric is determinable based on the building operations score corresponding to the building operations sub-metric with which the building operations financial sub-metric is mapped. For example, in some embodiments, the apparatus 200 is configured to utilize a predefined and/or user-defined algorithm that utilizes, at least in part, the building operations score for the building operations sub-metric. Additionally or alternatively, in some embodiments, the predefined and/or user-determined algorithm utilizes at least a portion of the building systems financial data 502, for example one or more cost(s) for utility consumption for a particular monitored building environment received in real-time from a smart utility system positioned in the monitored building environment.

As illustrated, the computing environment further includes an overall building financial score 508. In some embodiments, as depicted, the building operations financial metric set 506 is utilized to determine the overall building financial score 508. Specifically, for example in some embodiments, the building operations score set corresponding to the building operations financial metric set 506 is processed to determine the overall building financial score 508 for a particular monitored building environment. In some embodiments, the overall building financial score 508 represents an overall metric for how well the monitored building environment accomplishes all of the aspects represented by the various building operations financial metrics of the building operations financial metrics set 506. In this regard, the overall building financial score 508 provides a single metric that provides a high-level understanding of the financial health of a particular monitored building environment. In some embodiments, the overall building financial score 508 is determined from the building operations financial score set corresponding to the building operations financial metrics 506, for example based on a predefined algorithm and/or a user-determined algorithm. It should be appreciated that in some embodiments the predefined algorithm for determining each building operations score, each building operations financial score, the overall building operations, and the overall building financial score are each different.

In some embodiments, one or more data properties determinable from monitored building environment data is similarly mapped to a corresponding financial data value for the data property. In this regard, for example, building monitoring data may be processed in a similar manner to determine the financial data value for one or more data property. For example, in some embodiments, a raw financial data value is generated based on received building monitoring data 302. In some such embodiments, the raw data value is then utilized to determine a corresponding financial percentile data value based on benchmark data associated with the data property. In some such embodiments, the financial percentile data value is utilized as the financial data value for the data property. It should be appreciated that, in some such embodiments, a data property is associated with both an operations data value and a financial data value. Similarly, in some embodiments, a particular building operations metric and/or sub-metric is associated with a building operations score and a building operations financial score, for example based on one or more corresponding data value(s) and/or financial data value(s).

Utilizing the particular building operations financial scores for the building operations financial metric set 506, a particular monitored building environment (or plurality of monitored building environments) can be analyzed on key financial objectives determined to be of importance for the particular monitored building environment(s). Further, by determining an overall building financial score, the monitored building environment can be analyzed quickly and accurately based on a single metric. In this regard, utilizing the overall building financial score, building operations financial score for each building operations financial metric, and/or further the building operations financial score for each building operations financial scores for each building operations financial sub-metric, a monitored building environment similarly can be analyzed at various granular levels. In this regard, in some embodiments, the more granular scores can be further processed to determine one or more building operations financial metrics and/or one or more building operations financial sub-metrics that can be improved to improve the building operations financial score for a particular building operations financial metric and/or the overall building financial score. In this manner, similarly, the building operations financial sub-metric that would have the largest impact on improving the corresponding building operations financial metric if improved, and/or the building operations financial metric that would have the largest impact on improving the corresponding overall building financial score if improved, is determinable at any level of granularity desired. Further, such determinations can be updated in real-time based on updates represented in the building monitoring data 302 and/or building systems financial data 502 collected from various environment monitoring sensors positioned within the monitored building environment.

FIG. 5 illustrates example data values maintained as part of an example computing environment in accordance with at least some example embodiments of the present disclosure. Specifically, FIG. 5 illustrates an example mapping between building various aspects of a building operations metric and/or corresponding sub-metrics with a building operations financial metric and/or corresponding financial sub-metrics, as described herein. It should be appreciated that, in some such embodiments in this regard, each of the building operations metrics as described herein and/or corresponding sub-metrics is similarly mapped.

Specifically, as illustrated, the computing environment includes an example building operations metric 606 mapped to a building operations financial metric 612. In this regard, in some embodiments, the building operations score corresponding to the building operations metric 606 is utilized to determine the corresponding building operations financial score for the building operations financial metric 612. In some such embodiments, the apparatus 200 is configured to perform a first predefined algorithm and/or first user-determined algorithm for determining the building operations financial score for the building operations financial metric 612 from the building operations score corresponding to the building operations metric 606. In some embodiments, for example as illustrated, the building operations financial metric 612 is mapped to the building operations metric 606 and determinable from mappings between various sub-metrics. For example, in this regard, in some such embodiments the building operations score corresponding to the building operations metric 606 is not directly utilized in determining the building operations financial score for the corresponding building operations financial metric 612.

As depicted, the building operations metric 606 is associated with a building operations sub-metric set 602, and the building operations financial metric 612 is associated with a building operations financial sub-metric set 608. In this regard, each sub-metric of the building operations sub-metric set 602 maps to a corresponding building operations financial sub-metric of the building operations financial sub-metric 612. As depicted, for example, the building operations sub-metric 604A maps to the building operations financial sub-metric 610A, the building operations sub-metric 604B maps to the building operations financial sub-metric 610B, the building operations sub-metric 604C maps to the building operations financial sub-metric 610C, the building operations sub-metric 604D maps to the building operations financial sub-metric 610D, and the building operations sub-metric 604E maps to the building operations financial sub-metric 610E. The building operations score for the building operations sub-metric is utilizable to determine a corresponding building operations financial score for the mapped building operations financial sub-metric. In this regard, the building operations metric may similarly be considered as mapped to the corresponding building operations financial metric, such that the building operations financial score represents a particular financial health of the corresponding aspect represented by the building operations metric.

In some embodiments, the building operations score for a particular building operations metric is utilized in combination with additional data, such as one or more data values of building systems financial data associated with a monitored building environment, to determine the building operations financial score mapped to a particular building operations metric. In some such embodiments, one or more predefined algorithms is utilized to determine a building operations financial score mapped to a corresponding building operations score. For example, as illustrated, a first algorithm 612A, for example embodying a first user-defined algorithm or first predefined algorithm, is utilized to determine a building operations financial score for the building operations financial sub-metric 610A from the building operations score for the corresponding mapped building operations sub-metric 604A. In some such embodiments, for example, the first algorithm 612A utilizes the building operations score corresponding to the building operations sub-metric 604A and/or at least a first associated portion of building system financial data to determine the building operations financial score for the building operations financial sub-metric 610A. Similarly, for example as illustrated, a second algorithm 612B, for example embodying a second predefined algorithm or second user-defined algorithm, is utilized to determine a building operations financial score for the corresponding building operations financial sub-metric 610B. In some such embodiments, for example, the first algorithm 612B utilizes the building operations score corresponding to the building operations sub-metric 604B and/or at least a second associated portion of building system financial data to determine the building operations financial score for the building operations financial sub-metric 610B. It should be appreciated that, dependent on the building system financial data that is associated with each particular sub-metrics, different portions of the building system financial data are utilized by each algorithm and/or one or more overlapping portions of the building system financial data are utilized by two or more algorithms. A similar process continues for each of the remaining sub-metrics, for example, for the mapping between building operations sub-metric 604C and building operations financial sub-metric 610C utilizing the algorithm 612C, the mapping between building operations sub-metric 604D and building operations financial sub-metric 610D utilizing the algorithm 612D, and the mapping between the building operations sub-metric 604E and the building operations financial sub-metric 610E utilizing the algorithm 612E. In this regard, each of the algorithms 612A-612E in some embodiments are different from one another, and/or utilize distinct portions of building system financial data and/or building monitoring data, and/or may utilize one or more of the same data values in some embodiments.

As described herein with respect to building operations scores, one or more building operations financial scores may be determined based on benchmark financial data associated with any number of building environments. For example, benchmark financial data may include a median (or mean) and a standard deviation for one or more data properties utilized in determining a building operations financial score. A benchmark financial curve is derivable from the median and standard deviation, and subsequent raw data values may be applied to the benchmark financial curve to determine a percentile financial data value representing a building operations financial score and/or for deriving a building operations financial score. It should be appreciated that in this regard, the percentile financial data values are derived and/or utilized in a similar manner to that described herein with respect to the percentile data values for building operations score(s).

FIG. 7 illustrates example data values maintained as part of an example computing environment in accordance with at least some example embodiments of the present disclosure. Specifically, the computing environment illustrated includes a building operations metric improvement coefficient determined for one or more building operations metric. In this regard, the building operations metric improvement coefficient represents a level of improvement over time of the building operations score corresponding to the building operations improvement metric. Additionally or alternatively, in some embodiments, one or more building operations sub-metrics are each associated with a building operations sub-metric improvement coefficient. In this regard, the building operations metric improvement coefficient represents a level of improvement over time of the building operations score corresponding to the building operations sub-metric. It should be appreciated that, in some embodiments, a building operations financial metric improvement coefficient and/or building operations financial sub-metric improvement coefficient is/are similarly determinable.

In some embodiments, for example, a building operations metric improvement coefficient is associated with any one of a myriad of building operations metrics. In some such embodiments, the building operations metric improvement coefficient is determined based on various historical records including building operations scores for the building operations metric over a particular timestamp interval. In some embodiments, for example as depicted, one or more building operations sub-metric improvement coefficient(s) for a particular building operations metric are determined from historical records including building operations scores for the various building operations sub-metrics over a particular timestamp interval. In some such embodiments, the building operations sub-metric improvement coefficient for a particular building operations metric is determined from the building operations sub-metric improvement coefficients for the various building operations sub-metrics associated therewith.

As illustrated, for example, the computing environment includes a historical record set 702. The historical record set 702 includes building operations score set corresponding to a particular building operations sub-metric set. In this regard, the apparatus 200 in some embodiments is configured to store and/or retrieve historical records indicating building operations scores for such sub-metrics at all timestamps and/or various determinable timestamps. In this regard, in some embodiments, each stored record and/or data object including building operations scores for the various building operations sub-metrics is stored together with timestamp data representing the time at which the data was collected and/or stored. It should be appreciated that any of a number of historical records embodying previous building operations scores for building operations metrics are determinable for a particular monitored building environment. For example, in some embodiments, for a particular monitored building environment the apparatus 200 stores each determined building operations score for a building operations sub-metric associated with that monitored building environment, such that the stored records of such building operations scores are retrievable at subsequent time(s). It should be appreciated that, in some embodiments, the apparatus 200 identifies the historical record set 702 for a particular monitored building environment by querying for and/or otherwise retrieving such stored data associated with the monitored building environment for one or more prior timestamp intervals. For example, in some embodiments, the apparatus 200 retrieves historical record set 702 for a particular predetermined timestamp interval (e.g., including only the most recently stored building operations scores for the building operations sub-metrics, the records for the past month or other timestamp interval, and/or the like).

In some embodiments, the apparatus 200 processes the historical record set 702 to identify the building operations sub-metric improvement coefficient set 704 ("sub-metric coefficient set 704"). In some embodiments, for example, the apparatus 200 processes the historical record set 702 to determine a rate of change over the timestamp interval represented by the historical record set 702, and identifies the sub-metric improvement coefficient for a particular building operations based on the rate of change. For example, in some embodiments, the apparatus 200 determines whether the building operations score for a particular building operations sub-metric has improved over the timestamp interval (and/or a portion thereof, for example over the past month or another determined timestamp interval). Alternatively or additionally, in some embodiments, the building operations sub-metric improvement coefficient is determined based on the value of the corresponding change rate for the corresponding building operations score, and/or a determination based on whether the rate of change falls within various thresholds corresponding to particular sub-metric improvement coefficients. For example in some embodiments, as illustrated, the rate of change in a building operations score for a first building operations sub-metric, as determined from the historical record set 702, is utilized to determine the corresponding building operations sub-metric improvement coefficient 704A. similarly, the rate of change in a building operations score for a second building operations sub-metric, as determined from the historical record set 702, is utilized to determine the corresponding building operations sub-metric improvement coefficient 704B. It should be appreciated that, in this regard, such a process is repeated for any number of building operations metrics to determine a corresponding building operations sub-metric improvement coefficient for each building operations metric. For example, as illustrated, a similar process in some embodiments is performed to determine the building operations sub-metric improvement coefficients 704C, 704D, and 704E.

Additionally or alternatively, in some embodiments, the building operations sub-metric improvement coefficient set 704 is utilized to further determine the building operations metric improvement coefficient 706 for a corresponding building operations metric associated with the various sub-metrics. In some such embodiments, the building operations metric improvement coefficient 706 is determined from the building operations sub-metric improvement coefficient set 704 utilizing a predefined algorithm and/or a user-determined algorithm. In some embodiments, for example, the building operations metric improvement coefficient 706 is determined based on a weighted average of the building operations sub-metric improvement coefficient set 704 corresponding to the various sub-metrics for the building operations metric. In other embodiments, an alternative predefined algorithm is utilized to determine the building operations metric improvement coefficient 706 from the building operations sub-metric improvement coefficient set 704.

In some embodiments, the building operations metric improvement coefficient and/or sub-metric improvement coefficient set enable analysis of the change in operations of a monitored building environment over time. In this regard, as changes are made to operations of the monitored building environments, updated building monitoring data may be received and processed to monitor changes in one or more overall building operational score(s) and/or building operations score(s) for a particular building operations metric(s) and/or sub-metric(s). As such changes are stored in historical records, for example in a local or cloud database, the updates to such score(s) may further be analyzed to determine what monitored building environments are improving in their operations, and/or what is the source of such improvements in operations. Alternatively or additionally, in some embodiments, the improvements in operations reflected by the changes in one or more of the described score(s) is processable to determine what monitored building environments have improved the most overall in operations, and/or improved the most in particular operations associated with or otherwise represented by a particular building operations metric.

FIG. 8 illustrates a data flow for an example system in accordance with at least some example embodiments of the present disclosure. Specifically, FIG. 8 depicts a data flow between software-driven engines of a particular computing environment. It should be appreciated that the software systems depicted, in some embodiments, are embodied by any number of computing devices. For example, in some embodiments, the software systems is embodied by a single computing device, and in other embodiments is embodied by a plurality of computing devices, for example a single computing device for each software-driven engine. In some embodiments, the software-driven engines are each embodied by the apparatus 200 as described herein.

As depicted, the system includes a benchmark engine 810. In some embodiments, the benchmark engine 810 generates, determines, and/or processes benchmark data associated with one or more monitored building environments (e.g., benchmark financial standard(s) and/or benchmark operations standard(s)). In some such embodiments, the benchmark data is generated based on any number of monitored building environments, regardless of who owns, operates, and/or otherwise is associated with the monitored building environments. In this regard, in at least one example context, the benchmark data generated serves as an industry average for one or more score(s) determined as described herein, and/or serves as a range for one or more score(s) determined as described herein. For example, in some embodiments, the benchmark engine generates benchmarking data that provides an industry average building operations score and/or industry average building operations financial score corresponding to a particular building operations metric. Additionally or alternatively, in some embodiments, the benchmark engine generates benchmarking data that provides an industry range for building operations scores and/or building operations financial scores associated with a particular building operations metric.

In some embodiments, the benchmark engine generates, determines, and/or otherwise processes benchmark data for one or more particular monitored building environment type(s). For example, a first portion of the survey data 804 and a first portion of the monitored data 802 are identified as associated with a first monitored building environment type. In this regard, the first portion of the survey data 804 and the first portion for the monitored data 802 are utilized to generate, determine, and/or otherwise process first benchmark data associated with the first monitored building environment type. In this regard, the first benchmark data associated with the first monitored building environment type may be utilized for generating score(s) associated with monitored building environments sharing that monitored building environment type. Such monitored building environment type specific benchmark data use and scoring enables accurate comparison of monitored building environments based on sharing the monitored building environment type.

As depicted, the benchmark engine 810 receives as input at least building monitoring data 802. In some embodiments, the monitored data 802 includes at least real-time data received from a monitored building environment. Additionally or alternatively, in some embodiments, the monitored data 802 includes stored historical records of data monitored from within and/or otherwise associated with a particular monitored building environment. In some embodiments, the monitored data 802 includes data for any number of monitored building environments. For example, in some embodiments, the monitored data 802 includes data for all monitored building environments associated with a particular user account, for example such that data is analyzed within the scope of a particular user's portfolio. In other embodiments, the monitored data 802 includes data for monitored building environments associated with more than just a particular user account, for example such that data is analyzed within the scope of a particular industry more than just that particular user. In some embodiments, the monitored data 802 and/or a portion thereof is received from environment monitoring sensor(s) positioned in and/or otherwise associated with one or more monitored building environment(s). In some embodiments, additionally or alternatively, the monitored data 802 and/or a portion thereof is received from an internal database, for example maintained by the apparatus 200, and/or an external and/or third-party database, commercial database, and/or the like.

In some embodiments, the benchmark engine further receives as input survey data 804. In some embodiments, the survey data 804 includes data associated with one or more monitored building environments that was not received from environment monitoring sensors positioned within the building. For example, in some embodiments, the survey data 804 includes user-submitted response data associated with one or more aspects of a monitored building environment and/or operations of the monitored building environment. In this regard, the survey data 804 in some embodiments represents subjective data provided by occupants of a particular monitored building environment. In some such embodiments, the monitored data 802 is provided to enable the benchmark engine 810 to consider data associated with monitored building environments associated with a particular user account in generating a holistic benchmark for a particular industry.

In some embodiments, the survey data 804 and/or at least a portion thereof is received from one or more environment monitoring sensor(s) positioned within a monitored building environment and/or otherwise associated with a monitored building environment. For example, in some embodiments, the survey data 804 is received from an IoT-enabled device positioned within the monitored building environment, such as a smart voice assistance device, and/or user device of an occupant. Additionally or alternatively, in some embodiments, the survey data 804 is received from one or more databases internal to the apparatus 200 and/or an external and/or third-party database, commercial database, and/or the like. In some such embodiments, the survey data 804 is provided to enable analysis of subjective data utilized in generating one or more building operations scores for a particular building operations metric representing a subjective aspect of operations in the monitored building environment.

Further as depicted, the system includes a monitored building environment data processing engine 812. In some embodiments, the monitored building environment data processing engine 812. that pre-processes data that is further processed by the system. For example, in some embodiments, the monitored building environment data processing engine 812 scrubs one or more data inputs and/or otherwise adjusts one or more data inputs to prepare it for further processing. In some embodiments, for example, the monitored building environment data processing engine 812 removes missing and/or corrupted data from consideration. Additionally or alternatively, in some embodiments, the monitored building environment data processing engine 812 normalizes one or more data value(s) within a predefined range, adjusts one or more data value(s) based on a monitored building environment type, and/or the like.

In at least some embodiments, the monitored building environment data processing engine 812 processes data received in real-time to ensure the real-time data is formatted suitable for further processing. For example, as depicted, the monitored building environment data processing engine 812 receives as input at least the monitored data 802. In some such embodiments, the monitored building environment data processing engine 812 processes the monitored data 802 received from environment monitoring sensor(s) positioned in and/or associated with a monitored building environment to ensure the data is in a proper format for further processing.

Additionally or alternatively, in some embodiments, the monitored building environment data processing engine 812 receives as input monitored building environment metadata 808. In some embodiments, the monitored building environment metadata 808 includes data associated with static, categorical, and/or non-monitored aspects of a monitored building environment. For example, in some embodiments, the monitored building environment metadata 808 includes a square footage of a particular monitored building environment, data embodying and/or associated with a monitored building environment type for a monitored building environment, and/or the like. It should be appreciated that, in some embodiments, the monitored building environment metadata 808 is usable to adjust the monitored data 802 to produce a desired metric. For example, in some embodiments, a utility consumption amount associated with a monitored building environment included in the monitored data 802 is adjusted based on a square footage included in the monitored building environment metadata 808 to determine a consumption per square foot data value for a particular monitored building environment. Alternatively or additionally, in some embodiments, the monitored building environment metadata 808 is utilized to classify and/or categorize a monitored building environment with one or more other monitored building environments, for example based on a monitored building environment type, such that monitored building environments of a shared monitored building environment type may be processed and/or compared with respect to one another.

As depicted, the system further includes the monitored building environment scoring engine 814. In some embodiments, the monitored building environment scoring engine 814 is configured to generate the scores 816, for example embodying any one or more of the scores described herein. For example, in some embodiments, the scores 816 include any one or more of the various scores described herein, such as the building operations score(s) for one or more building operations metrics and/or building operations sub-metrics, overall building operations score(s), building operations financial score(s), and/or overall building financial score(s). In some such embodiments, the score(s) 816 are generated based on the outputs from the benchmark engine 810 and/or monitored building environment data processing engine 812. For example, in some embodiments, the monitored building environment data processing engine 812 outputs building monitoring data for processing and the benchmark engine 810 outputs benchmark data for processing, such that the building monitoring data and/or benchmark data is utilized to generate such score(s) and/or aspects of such score(s). In some embodiments, for example, the benchmark data output by the benchmark engine 810 is utilized to determine a classification for a monitored building environment based on the generated score(s).

Example Processes of the Disclosure

Having described example systems, apparatuses, and data flows associated with embodiments of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. In regards to the below flowcharts, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 9 illustrates a flowchart including operations of an example process for monitored building environment scoring in accordance with at least one example embodiment of the present disclosure. In some embodiments, the computer-implemented process 900 is embodied by computer program code stored on a non-transitory computer-readable medium of a computer program product configured for execution to perform the computer-implemented method. Alternatively or additionally, in some embodiments, the example process 900 is performed by one or more specially configured computing devices, such as the monitored building environment processing system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 900. In some embodiments, the specially configured apparatus 200 includes and/or otherwise is in communication with one or more external apparatuses, systems, devices, and/or the like, to perform one or more of the operations as depicted and described.

The process 900 begins at operation 902. At operation 902, the apparatus 200 includes means, such as the input/output circuitry 206, communications circuitry 208, operations scoring circuitry 210, financial scoring circuitry 212, processor 202, and/or the like, to receive, via a plurality of environment monitoring sensors positioned in at least one monitored building environment, building monitoring data. In some embodiments, the building monitoring data is received-in real-time. Additionally or alternatively, in some embodiments, the building monitoring data is pre-processed to adjust one or more data values to a usable format. As described herein, the building monitoring data may include data representing any of a myriad of data types, including for example objective data associated with operations of a monitored building environment (e.g., utility consumption amount(s)) and/or subjective data associated with operations of a monitored building environment (e.g., survey data with responses from monitored building environment occupants). It should be appreciated that, as described herein, the apparatus 200 receives building monitoring data associated with a plurality of monitored building environments, two or more of which may be associated with one another, for example in a circumstance where two or more monitored building environments are associated with a particular user account.

At operation 904, the apparatus 200 includes means, such as the input/output circuitry 206, communications circuitry 208, operations scoring circuitry 210, financial scoring circuitry 212, processor 202, and/or the like, to determine, for at least one monitored building environment and based on the building monitoring data, a building operations score set corresponding to a building operations metric set. In some embodiments, the building operations metric set is automatically determined by the apparatus 200, for example in a circumstance where the same building operations metrics are utilized for each monitored building environment. In some other embodiments, the building operations metric set is determinable based on the building monitoring data, for example such that the building operations metric set is determined based on a monitored building environment type identified for the at least one monitored building environment. It should be appreciated that, in some embodiments, the apparatus 200 determines a plurality of building operations score sets for any number of monitored building environments.

In some embodiments, benchmark operations data is received and/or otherwise identified for use in determining a building operations score set. For example, in some embodiments, benchmark operations data is utilized to determine benchmark curve(s). Raw data value(s) are determined from the building monitoring data and applied to the benchmark curve to determined percentile data values utilized as a building operations score and/or utilized to derive a building operations score therefrom. In this regard, the building operations score set may represent how well monitored building environment meets certain desired aspects of operations as compared to other monitored building environments based on the building monitored data for that monitored building environment.

At operation 906, the apparatus 200 includes means, such as the input/output circuitry 206, communications circuitry 208, operations scoring circuitry 210, financial scoring circuitry 212, processor 202, and/or the like, to determine, for the at least one monitored building environment, an overall building operational score. In some embodiments, the building operational score is determined based on the building operations score set for the building operations metric. In this regard, in some such embodiments, the building operational score is determined indirectly based on the building monitoring data received at an earlier operation. It should be appreciated that the building operational score in some embodiments is determined based on a predefined algorithm that utilizes the building operation score set, for example based on a weighted average of such scores in the building operations score set. It should be appreciated that, in some embodiments, the apparatus 200 determines a plurality of building operational scores associated with a plurality of monitored building environments, for example an overall building operational score for any number of monitored building environments.

At optional operation 908, the apparatus 200 includes means, such as the input/output circuitry 206, communications circuitry 208, operations scoring circuitry 210, financial scoring circuitry 212, processor 202, and/or the like, to receive building system financial data for at least one monitored building environment. In some embodiments, the building system financial data is received together with, and/or as a part of, the building monitoring data. In some embodiments, at least a portion of the building system financial data is received from one or more environment monitoring sensor(s) positioned within the monitored building environment. Additionally or alternatively, in some embodiments, at least a portion of the building system financial data is received from one or more third-party and/or external systems and/or databases. In some embodiments, such building system financial data represents financial information associated with processing the building monitoring data for a particular monitored building environment.

At optional operation 910, the apparatus 200 includes means, such as the input/output circuitry 206, communications circuitry 208, operations scoring circuitry 210, financial scoring circuitry 212, processor 202, and/or the like, to generate a building operations financial score set corresponding to the building operations metric set by applying the building operations score set to a building finance scoring model. In some embodiments, the building finance scoring model embodies a predefined function that generates a building operation financial score from a corresponding building operations score and/or corresponding financial data. For example, in some embodiments, a building finance scoring model utilizes building system financial data to generate a building operations financial score for a particular building operations metric based on the building operations score for that building operations metric.

At optional operation 912, the apparatus 200 includes means, such as the input/output circuitry 206, communications circuitry 208, operations scoring circuitry 210, financial scoring circuitry 212, processor 202, and/or the like, to determine for the at least one monitored building environment, an overall building financial score. In some embodiments, the overall building financial score is determined based on the building operations financial score set corresponding to the building operations metric set. In this regard, in some such embodiments, the overall building financial score is indirectly generated based on the building monitoring data and/or building system financial data. It should be appreciated that, in some embodiments, the building operational score is determined based on a predefined algorithm that utilizes the building operations financial score set, for example based on a weighted average of such scores in the building operations financial score set. It should be appreciated that, in some embodiments, the apparatus 200 determines a plurality of overall building financial scores associated with a plurality of monitored building environments, for example an overall building operational score for any number of monitored building environments.

At optional operation 914, the apparatus 200 includes means, such as the input/output circuitry 206, communications circuitry 208, operations scoring circuitry 210, financial scoring circuitry 212, processor 202, and/or the like, to cause rendering of a user interface dashboard. In some embodiments, the user interface dashboard includes various information determined by the apparatus 200 and/or functionality associated therewith. For example, in one or more embodiments, the user interface dashboard is rendered based on the building operations score set, the building operations financial score set, the overall building operational score, and/or the overall building financial score.

At optional operation 916, the apparatus 200 includes means, such as the input/output circuitry 206, communications circuitry 208, operations scoring circuitry 210, financial scoring circuitry 212, processor 202, and/or the like, to maintain at least one database that stores at least some of the data received and/or determined by the apparatus 200. In this regard, in some embodiments, the data is stored as historical records retrievable at a later time for subsequent iterations of processing. For example, the stored score(s) for particular timestamp intervals in some embodiments are further processable to determines improvement coefficient(s) associated with such score(s) over time. In some embodiments, for example, the apparatus 200 maintains one or more databases that store the building operations score set, the building monitoring data, the overall building operational score, the building operations financial score set, and/or the overall building financial score. It should be appreciated that in some embodiments, the at least one database is maintained within and/or local to the apparatus 200. In other embodiments, at least one database includes a cloud database remotely located from the apparatus 200 and accessible for processing and/or control by the apparatus 200.

FIG. 10 illustrates a flowchart depicting additional operations of an example process for improved monitored building environment scoring in accordance with at least some example embodiments of the present disclosure. Specifically, FIG. 10 depicts an example process 1000 for generating a building operational financial score. In some embodiments, the computer-implemented process 1000 is embodied by computer program code stored on a non-transitory computer-readable medium of a computer program product configured for execution to perform the computer-implemented method. Alternatively or additionally, in some embodiments, the example process 1000 is performed by one or more specially configured computing devices, such as the monitored building environment processing system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 1000. In some embodiments, the specially configured apparatus 200 includes and/or otherwise is in communication with one or more external apparatuses, systems, devices, and/or the like, to perform one or more of the operations as depicted and described.

The process 1000 begins at operation 1002. In some embodiments, the process 1000 begins after one or more operations of another process, such as the operation 908 of the process 900 as depicted and described. Additionally or alternatively, in some embodiments, upon completion of the process 1000 flow proceeds to one or more operations of another process, such as the operation 912 as depicted and described. In other embodiments, the flow ends upon completion of the process 1000.

At operation 1002, the apparatus 200 includes means, such as the input/output circuitry 206, communications circuitry 208, operations scoring circuitry 210, financial scoring circuitry 212, processor 202, and/or the like, to retrieve, in real-time, building system rate data from a smart utility system. In some embodiments, the smart utility system embodies an environment monitoring system positioned in the monitored building environment. Alternatively or additionally, in some embodiments, the smart utility system is otherwise positioned associated with the monitored building environment, for example to monitor utility consumption by one or more monitored building environments. In some embodiments, the apparatus 200 retrieves the building system rate data from the smart utility system utilizing one or more requests and/or response transmissions with the smart utility system over a communications network. For example, in some embodiments, the apparatus 200 transmits the a specially configured request to the smart utility system that requests the current real-time cost of consumption rate for a particular utility, and receives the building system rate data representing the current real-time cost of consumption rate in response. It should be appreciated that, in some embodiments, the apparatus 200 retrieves any number of building system rate data from any number of smart utility systems, for example building system rate data associated with each utility provided to a monitored building environment.

At operation 1004, the apparatus 200 includes means, such as the input/output circuitry 206, communications circuitry 208, operations scoring circuitry 210, financial scoring circuitry 212, processor 202, and/or the like, to generate, utilizing at least the building system rate data, at least one building operations financial score of the building operations financial score set. In some such embodiments, for example, the building system raw data is utilized to determine a cost of a consumed amount of a certain utility for a monitored building environment as identified from building monitoring data received associated with the monitored building environment. In some embodiments, the generated cost of consumed amount of a utility is subsequently utilized in determining one or more building operations financial scores, for example associated with a utility consumption building operations metric.

FIG. 11 illustrates a flowchart depicting additional operations of an example process for improved monitored building environment scoring in accordance with at least some example embodiments of the present disclosure. Specifically, FIG. 11 depicts an example process 1100 for generating a building operational financial score. In some embodiments, the computer-implemented process 1100 is embodied by computer program code stored on a non-transitory computer-readable medium of a computer program product configured for execution to perform the computer-implemented method. Alternatively or additionally, in some embodiments, the example process 1100 is performed by one or more specially configured computing devices, such as the monitored building environment processing system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 1100. In some embodiments, the specially configured apparatus 200 includes and/or otherwise is in communication with one or more external apparatuses, systems, devices, and/or the like, to perform one or more of the operations as depicted and described.

The process 1100 begins at operation 1102. In some embodiments, the process 1100 begins after one or more operations of another process, such as the operation 902 of the process 900 as depicted and described. Additionally or alternatively, in some embodiments, upon completion of the process 1100 flow proceeds to one or more operations of another process, such as the operation 906 as depicted and described. In other embodiments, the flow ends upon completion of the process 1100.

At operation 1102, the apparatus 200 includes means, such as the input/output circuitry 206, communications circuitry 208, operations scoring circuitry 210, financial scoring circuitry 212, processor 202, and/or the like, to determine a sub-metric score set for at least a first building operations metric of the building operations metric set. In some embodiments, for example, a first building operations metric is associated with any number of building operations sub-metrics associated with the first building operations metric. In some embodiments, as described herein, the apparatus 200 is configured based on a predefined association between a building operations metric and any number of building operations sub-metrics. It should be appreciated that, in some embodiments, the building operations score for a building operations sub-metric is determined in a similar manner to that described with respect to a building operations score at operation 904. For example, in some embodiments, the apparatus 200 processes one or more portions of building monitoring data to determine abuilding operations score for a building operations sub-metric of the sub-metric score set. It should appreciated that such sub-metric score operations in some embodiments are repeated for any number of building operations sub-metrics.

At operation 1104, the apparatus 200 includes means, such as the input/output circuitry 206, communications circuitry 208, operations scoring circuitry 210, financial scoring circuitry 212, processor 202, and/or the like, to determine the building operations score for the first building operations metric based on the sub-metric score set. For example, in some embodiments, the apparatus 200 determines the building operations score based on the sub-metric score set utilizing a predefined algorithm. In some embodiments, the building operations score for the first building operations metric is determined utilizing a weighted algorithm based on the various sub-metric scores in the sub-metric score set. It should be appreciated that, in some embodiments, the apparatus 200 repeats this process to determine a building operations score for any of a myriad of building operations metrics based on a sub-metric score set for the building operations sub-metrics corresponding to the building operations metric.

FIG. 12 illustrates a flowchart depicting additional operations of an example process for improved monitored building environment scoring in accordance with at least some example embodiments of the present disclosure. Specifically, FIG. 12 depicts an example process 1200 for generating one or more portfolio-level scores associated with a plurality of monitored building environments. In some embodiments, the computer-implemented process 1200 is embodied by computer program code stored on a non-transitory computer-readable medium of a computer program product configured for execution to perform the computer-implemented method. Alternatively or additionally, in some embodiments, the example process 1200 is performed by one or more specially configured computing devices, such as the monitored building environment processing system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 1200. In some embodiments, the specially configured apparatus 200 includes and/or otherwise is in communication with one or more external apparatuses, systems, devices, and/or the like, to perform one or more of the operations as depicted and described.

The process 1200 begins at operation 1202. In some embodiments, the process 1200 begins after one or more operations of another process, such as the operation 902 of the process 900 as depicted and described. Additionally or alternatively, in some embodiments, upon completion of the process 1200 flow proceeds to one or more operations of another process, such as the operation 914 as depicted and described. In other embodiments, the flow ends upon completion of the process 1200.

At operation 1202, the apparatus 200 includes means, such as the input/output circuitry 206, communications circuitry 208, operations scoring circuitry 210, financial scoring circuitry 212, processor 202, and/or the like, to receive building monitoring data for each of a plurality of associated remote monitored building environments. For example, in some embodiments, the apparatus 200 receives building monitoring data for each monitored building environment from environment monitoring sensor(s) positioned in each monitored building environment. Additionally or alternatively, in some embodiments, the apparatus 200 receives building monitoring data for one or more of the plurality of associated remote monitored building environments from one or more third-party and/or external databases that store building monitoring data associated with one or more monitored building environments. It should be appreciated that, in some embodiments where the apparatus 200 receives building monitoring data for a plurality of associated remote monitored building environments, the apparatus 200 maintains the building monitoring data in a manner such that the monitored building environment associated with the building monitoring data is identifiable. In some embodiments, the associated remote monitored building environments are each linked to and/or otherwise associated with a particular user account, for example corresponding to an owner of the monitored building environment, an operator of the monitored building environment, and/or the like.

At operation 1204, the apparatus 200 includes means, such as the input/output circuitry 206, communications circuitry 208, operations scoring circuitry 210, financial scoring circuitry 212, processor 202, and/or the like, to determine, based on at least the building monitoring data for each of the plurality of associated remote monitored building environments, an overall building operational score for each of the plurality of associated remote monitored building environments. In some embodiments, for example, the apparatus 200 determines, for each associated remote monitored building environment, a building operations score set corresponding to a building operations metric set. In some such embodiments, the apparatus 200 determines the building operations score set based on a portion of the building monitoring data associated with the monitored building environment. In some embodiments, for example, the apparatus 200 generates each overall building operational score and/or a building operations score set for each monitored building environment based on the separate data portions associated with each monitored building environment. In this regard, the building operations score set in some such embodiments may differ for each monitored building environment of the associated remote monitored building environments based on the building monitoring data associated with the monitored building environment. In this regard, it should be appreciated that in some embodiments, the overall building operational score is determined for each monitored building environment in the manner described with respect to an individual monitored building environment at operation 904.

At optional operation 1206, the apparatus 200 includes means, such as the input/output circuitry 206, communications circuitry 208, operations scoring circuitry 210, financial scoring circuitry 212, processor 202, and/or the like, to determine, based on at least the building monitoring data for each of the plurality of associated remote monitored building environments, an overall building financial score for each of the plurality of associated remote monitored building environments. For example, in some embodiments, the apparatus 200 determines the overall building financial score for each remote monitored building environment based on a determined building operations score set for the monitored building environment and/or building systems financial data received associated with a particular monitored building environment. In some embodiments, for example, the apparatus 200 generates the overall building financial score for each monitored building environment based on the separate data portions associated with each monitored building environment.

At optional operation 1208, the apparatus 200 includes means, such as the input/output circuitry 206, communications circuitry 208, operations scoring circuitry 210, financial scoring circuitry 212, processor 202, and/or the like, to determine a portfolio overall building operational score for the plurality of associated remote monitored building environments. The portfolio overall building operational score represents a single overall metric that represents how well all of the associated remote monitored building environments meet the building operations metrics overall. In some embodiments, the portfolio overall building operational score is determined utilizing a predefined algorithm that utilizes the overall building operations score for each of the plurality of associated remote monitored building environments. For example, in some embodiments, the apparatus 200 performs an average and/or performs a weighted average based on the overall building operational scores for each of the associated remote monitored building environments.

At optional operation 1210, the apparatus 200 includes means, such as the input/output circuitry 206, communications circuitry 208, operations scoring circuitry 210, financial scoring circuitry 212, processor 202, and/or the like, to determine a portfolio overall building financial score for the plurality of associated remote monitored building environments. The portfolio overall building financial score represents a single overall metric that represents how well all of the associated remote monitored building environments meet the desired building operations financial metrics overall. In some embodiments, the portfolio overall building financial score is determined utilizing a predefined algorithm that utilizes the overall building financial score for each of the plurality of associated remote monitored building environments. For example, in some embodiments, the apparatus 200 performs an average and/or performs a weighted average based on the overall building financial scores for each of the associated remote monitored building environments.

At optional operation 1212, the apparatus 200 includes means, such as the input/output circuitry 206, communications circuitry 208, operations scoring circuitry 210, financial scoring circuitry 212, processor 202, and/or the like, to cause rendering of a user interface dashboard that identifies a preferred monitored building environment of the plurality of remote monitored building environments. In some embodiments, for example, the apparatus 200 determines the preferred monitored building environment based on the overall building operational scores for each of the plurality of associated remote monitored building environments and/ or the overall building financial score for each of the plurality of associated remote monitored building environments. For example, in some embodiments, the apparatus 200 determines the preferred monitored building environment as the monitored building environment of the plurality of associated remote monitored building environments that is associated with the best (e.g., highest) overall building operational score. In other embodiments, the apparatus 200 determines the preferred monitored building environment as the monitored building environment of the plurality of associated remote monitored building environments that is associated with the best overall building financial score. In yet other embodiments, the preferred monitored building environment is determined based on a predefined algorithm based on both the overall building operational score and overall building financial score for each monitored building environment. Additionally or alternatively, in some embodiments, the user interface dashboard is rendered including the portfolio overall building operational score and/or the portfolio overall building financial score for the plurality of associated remote monitored building environments. It should be appreciated that, in some embodiments, a single user interface dashboard is rendered including both the preferred monitored building environment and/or one or more data values and/or properties described herein with respect to operation 914.

FIG. 13 illustrates a flowchart depicting additional operations of an example process for improved monitored building environment scoring in accordance with at least some example embodiments of the present disclosure. Specifically, FIG. 13 depicts an example process 1300 for determining a building operation score utilizing a monitored building environment type. In some embodiments, the computer-implemented process 1300 is embodied by computer program code stored on a non-transitory computer-readable medium of a computer program product configured for execution to perform the computer-implemented method. Alternatively or additionally, in some embodiments, the example process 1300 is performed by one or more specially configured computing devices, such as the monitored building environment processing system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 1300. In some embodiments, the specially configured apparatus 200 includes and/or otherwise is in communication with one or more external apparatuses, systems, devices, and/or the like, to perform one or more of the operations as depicted and described.

The process 1300 begins at operation 1302. In some embodiments, the process 1300 begins after one or more operations of another process, such as the operation 902 of the process 900 as depicted and described. Additionally or alternatively, in some embodiments, upon completion of the process 1300 flow proceeds to one or more operations of another process, such as the operation 914 as depicted and described. In other embodiments, the flow ends upon completion of the process 1300.

At operation 1302, the apparatus 200 includes means, such as the input/output circuitry 206, communications circuitry 208, operations scoring circuitry 210, financial scoring circuitry 212, processor 202, and/or the like, to identify a monitored building environment type associated with the at least one monitored building environment. In some embodiments, the monitored building environment type is determinable from a look-up table maintained by the apparatus 200. In this regard, in some such embodiments, the apparatus 200 maintains a look-up table that includes monitored building environment types mapped to different building monitoring data, such as building metadata from external and/or third-party databases and/or data received from environment monitoring sensors, that are utilized to determine an appropriate building. For example, in some embodiments, the apparatus 200 maintains a look-up table that maps monitored building environment types to corresponding values representing the type of service the monitored building environment is utilized for, a square footage of the monitored building environment, a size of the monitored building environment, and/or the like, or any combination thereof.

In some embodiments, received building monitoring data received by the apparatus 200 includes a data value representing the monitored building environment type. For example, in some embodiments, the apparatus 200 receives building metadata including and/or otherwise embodying a monitored building environment type associated with one or more monitored building environment(s). Additionally or alternatively, in some embodiments, the apparatus 200 identifies a monitored building environment type for at least one monitored building environment based on the building monitoring data associated with that monitored building environment. For example, in some embodiments, the apparatus 200 determines the monitored building environment type based on particular utility usage associated with the monitored building environment. Alternatively or additionally, in some embodiments, one or more data values for a particular type of building monitoring data is utilized to determine a monitored building environment type for a monitored building environment with which the building monitoring data is associated.

At operation 1304, the apparatus 200 includes means, such as the input/output circuitry 206, communications circuitry 208, operations scoring circuitry 210, financial scoring circuitry 212, processor 202, and/or the like, to determine at least one building operations score of the building operations score set based at least on the monitored building environment type. Additionally or alternatively, in some embodiments, the apparatus 200 determines at least one building operations score based on the monitored building environment type and an environment regulatory threshold associated with the at least one monitored building environment type. In some embodiments, for example, the apparatus 200 determines a particular predefined algorithm to utilize in generating a building operations score for a particular building operations metric based on the monitored building environment type for the monitored building environment. Alternatively or additionally, in some embodiments, the apparatus 200 determines the building operations score based on the environment regulatory threshold associated with the monitored building environment type for a particular monitored building environment. For example, in some embodiments, the apparatus 200 determines a building operations score based on a determination, for example based on building monitoring data for a particular monitored building environment, of whether the monitored building environment satisfies the environment regulatory threshold and/or how much the monitored building environment. In some embodiments, for example, the environment regulatory threshold includes various threshold ranges for one or more determinable aspects of a monitored building environment, such that a building operations score is determinable based on the threshold range within which an aspect of the monitored building environment is determined based on corresponding building monitoring data.

In some embodiments, the monitored building environment type enables categorization and/or other associating between various monitored building environments. For example, in some embodiments, the monitored building environment type for a monitored building environment is utilized to enable monitored building environments to be processed based on other monitored building environments that share their monitored building environment type. For example, in a circumstance where building operations scores and/or building operations financial scores are being generated for a particular monitored building environment having a particular monitored building environment type, the generated scores may be generated only based on data associated with other monitored building environments of the monitored building environment same type and/or only compared to other monitored building environments of the same monitored building environment type.

At optional operation 1306, the apparatus 200 includes means, such as the input/output circuitry 206, communications circuitry 208, operations scoring circuitry 210, financial scoring circuitry 212, processor 202, and/or the like, to categorize the overall building operational score with at least one other overall building operational score based on a geographic region associated with the at least one monitored building environment. In this regard, in some embodiments, the apparatus 200 categorizes monitored building environments and/or corresponding scores (e.g., overall building operational scores) based on a determination that a plurality of monitored building environments are located in a particular geographic region. It should be appreciated that the geographic regions utilized to categorize monitored building environments may be configured at any level of desired granularity, for example by country, by region (e.g., southeast, southwest, and the like), by province, by state, by city, by town, by zip code, by neighborhood, by street, and/or the like. In this regard, in some embodiments, the apparatus processes the building operational scores for monitored building environments in a particular geographic region together and/or renders information that enables the user to identify such monitored building environments and/or corresponding overall building operational scores as being categorized together based on the associated geographic region.

FIG. 14 illustrates a flowchart depicting additional operations of an example process for improved monitored building environment scoring in accordance with at least some example embodiments of the present disclosure. Specifically, FIG. 14 depicts an example process 1400 for determining an overall building operational score based on a metric weight set for one or more building operations metric. In some embodiments, the computer-implemented process 1400 is embodied by computer program code stored on a non-transitory computer-readable medium of a computer program product configured for execution to perform the computer-implemented method. Alternatively or additionally, in some embodiments, the example process 1400 is performed by one or more specially configured computing devices, such as the monitored building environment processing system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 1300. In some embodiments, the specially configured apparatus 200 includes and/or otherwise is in communication with one or more external apparatuses, systems, devices, and/or the like, to perform one or more of the operations as depicted and described.

The process 1400 begins at operation 1402. In some embodiments, the process 1400 begins after one or more operations of another process, such as the operation 904 of the process 900 as depicted and described. Additionally or alternatively, in some embodiments, upon completion of the process 1400 flow proceeds to one or more operations of another process, such as the operation 908 as depicted and described. In other embodiments, the flow ends upon completion of the process 1400.

At operation 1402, the apparatus 200 includes means, such as the input/output circuitry 206, communications circuitry 208, operations scoring circuitry 210, financial scoring circuitry 212, processor 202, and/or the like, to generate a metric weight set corresponding to the building operations metric set. In some embodiments, the metric weight set for a particular monitored building environment is determinable based on a determined and/or otherwise identified monitored environment type corresponding to the monitored building environment. In this regard, the metric weight set in some embodiments is specially configured to weight important building operations metrics for a particular monitored environment type higher than remaining building operations metric(s). In some embodiments, for example, the apparatus 200 generates a metric weight set based on predefined metric weights for each building operations metric in the building operations metric set. Alternatively or additionally, in some embodiments, the apparatus 200 generates the metric weight set corresponding to the building operations metric set based on a user-determined metric weight for each building operations metric set. In some embodiments, the metric weight set includes one or more multiplier values representing an importance value of each of the building operations metrics of a building operations metric set. In some embodiments, each building operations metric of a building operations metric set is weighted equally, such that the importance of each building operations metric is equally valued for purposes of determining a corresponding building operational score.

At operation 1404, the apparatus 200 includes means, such as the input/output circuitry 206, communications circuitry 208, operations scoring circuitry 210, financial scoring circuitry 212, processor 202, and/or the like, to determine the overall building operational score based on the metric weight set. In some embodiments, the building operational score is determined based on the building operations score set for the building operations metric. In this regard, in some such embodiments, the building operational score is determined indirectly based on the building monitoring data received at an earlier operation. It should be appreciated that the building operational score in some embodiments is determined based on a predefined algorithm that utilizes the building operation score set, for example based on a weighted average of such scores in the building operations score set. It should be appreciated that, in some embodiments, the apparatus 200 determines a plurality of building operational scores associated with a plurality of monitored building environments, for example an overall building operational score for a particular monitored building environment based on the metric weight set for the building operations metric set. For example, in some embodiments, the apparatus 200 determines a building operations score set including a building operations score for each building operations metric in a building operations metric set. Additionally or alternatively, in some embodiments, the apparatus 200 utilizes the metric weight set to perform a weighted average of the building operations score set corresponding to the building operations metric set. In this regard, it should be appreciated that in some embodiments the metric weight set is adjusted based on importance of particular building operations metrics for a particular monitored building environment to ensure the corresponding determined overall building operational score appropriately reflects the importance of the building operations score(s) corresponding to each of such metrics.

FIG. 15 illustrates a flowchart depicting additional operations of an example process for improved monitored building environment scoring in accordance with at least some example embodiments of the present disclosure. Specifically, FIG. 15 depicts an example process 1500 for presenting notification action information associated with at least one monitored building environment. In some embodiments, the computer-implemented process 1500 is embodied by computer program code stored on a non-transitory computer-readable medium of a computer program product configured for execution to perform the computer-implemented method. Alternatively or additionally, in some embodiments, the example process 1500 is performed by one or more specially configured computing devices, such as the monitored building environment processing system 102 embodied by the specially configured apparatus 200. In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example process 1500. In some embodiments, the specially configured apparatus 200 includes and/or otherwise is in communication with one or more external apparatuses, systems, devices, and/or the like, to perform one or more of the operations as depicted and described.

The process 1500 begins at operation 1502. In some embodiments, the process 1500 begins after one or more operations of another process, such as the operation 90 of the process 900 as depicted and described. Additionally or alternatively, in some embodiments, upon completion of the process 1500 flow proceeds to one or more operations of another process, such as the operation 916 as depicted and described. In other embodiments, the flow ends upon completion of the process 1500.

At operation 1502, the apparatus 200 includes means, such as the input/output circuitry 206, communications circuitry 208, operations scoring circuitry 210, financial scoring circuitry 212, processor 202, and/or the like, to determine a notification action associated with at least one building operations metric of the building operations metric set. In some embodiments, the notification action includes and/or is otherwise associated with information utilized to improve at least one building operations score associated with a building operations metric. For example, in some embodiments, the apparatus 200 determines a notification action based on historical records that are associated with a higher building operations score for one or more building operations metrics. For example, in some embodiments, the notification action includes and/or is embodied by data indicating that operational changes to the monitored building environment will improve one or more building operations scores for one or more building operations metrics. In some embodiments, the notification action is determined based on building monitoring data associated with the monitored building environment. For example, in some embodiments, the apparatus 200 determines from the building monitoring data that one or more systems operating within and/or associated with the monitored building environment is/are functioning at a diminished capacity, such that repairing and/or improving the system(s) would improve monitored building environment score(s) for corresponding building operations metric(s) with which such systems are associated. Additionally or alternatively, in some embodiments, the notification action includes one or more system predictions associated with systems operating within the monitored building environment. For example, in some embodiments, the notification action includes one or more predicted system failures of based on building monitoring data associated with operations of such systems for a particular monitored building environment. Additionally or alternatively, in some embodiments, the apparatus 200 determines a maintenance notification action that identifies particular maintenance of one or more systems for a monitored building environment that require repair and/or are determined to soon require repair. In some embodiments, the apparatus 200 further determines the notification action to indicate that if the maintenance for one or more systems is performed, the corresponding building operational score corresponding to the building operations metric will improve. It should be appreciated that, in other embodiments, any determined information to be presented in a user-facing manner embodies a notification action for rendering.

At operation 1504, the apparatus 200 includes means, such as the input/output circuitry 206, communications circuitry 208, operations scoring circuitry 210, financial scoring circuitry 212, processor 202, and/or the like, to present information associated with the notification action to at least one device. In this regard, for example, in some embodiments the apparatus 200 presents information indicating the determined notification action, and/or in some embodiments presents information indicating user actions recommended and/or otherwise suggested to perform based on the determined notification action (e.g., one or more system maintenance events to perform by a user). In some embodiments, for example, the information associated with the notification action is presented to at least one client device associated with a user accessing the apparatus 200. In some embodiments, the information is presented via one or more user interfaces rendered to the device. For example, in some embodiments, the information associated with the notification action is presented via causing rendering of such information to the one or more user interfaces. In some embodiments, the apparatus 200 causes rendering of a user interface dashboard including such information associated with the notification action. For example, in some such embodiments, the apparatus 200 presents the information associated with the notification action to at least one client device by transmitting one or more specially configured transmissions to the device to cause the client device to render such information via a corresponding user interface.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   at a device with one or more processors and a memory:
      receiving, via a plurality of environment monitoring sensors positioned in a building environment, building monitoring data;
      determining, for the building environment, based on the building monitoring data, an overall building operations score indicative of an operational performance of the building environment, wherein determining the overall building operations score comprises:
         determining, based on the building monitoring data, a building operations score set for a plurality of building operations metrics, each building operations score of the building operations score set is indicative of a performance of at least one operation in the building represented by a corresponding building operations metric, and wherein the plurality of building operations metrics comprises: a people metric, a process metric, an assets metric, a connectivity metric, and an environment metric, and wherein each building operations metric is associated with a plurality of building operations sub-metrics applicable for the corresponding building operations metric, wherein determining the building operations score set comprises:
            determining a first building operations score for a first building operations metric based on one or more first sub-scores associated with a plurality of first building operations sub-metrics; and
            determining a second building operations score for a second building operations metric based on: the one or more first sub-scores associated with the plurality of first building operations sub-metrics and one or more second sub-scores associated with a plurality of second building operations sub-metrics.

2. The method of claim 1, further comprising:
receiving building system financial data for the building environment;
generating a building operations financial score set corresponding to the plurality of building operations metrics by applying the building operations score set to a building finance scoring model;
retrieving, in real-time, building system rate data from a smart utility system;
generating, utilizing the building system rate data, at least one building operations financial score of the building operations financial score set; and
causing rendering of a user interface dashboard that comprises at least one of: a building operations financial score of the building operations financial score set and a benchmark financial standard set.

3. The method of claim 1, further comprising:
causing rendering of a user interface dashboard that comprises at least the building operations score set and an benchmark operational score set.

4. The method of claim 1, further comprising:
receiving the building monitoring data from at least one of the plurality of environment monitoring sensors in real-time.

5. The method of claim 1, further comprising:
determining a sub-metric score set for at least the first building operations metric, wherein the first building operations metric is one of: the people metric, the process metric, the assets metric, the connectivity metric, or the environment metric, wherein the people metric is associated with wellness of occupants within the building environment, and wherein the process metric is associated with at least one process related to at least one building operation within the building environment, wherein the assets metric is associated with at least one asset within the building environment, wherein the connectivity metric is associated with security of flow of information within the building environment, and wherein the environment metric is associated with an impact of the building on environment; and
determining the building operations score for the first building operations metric based on the sub-metric score set.

6. The method of claim 5, further comprising:
generating the first building operations metric based on the sub-metric score set using a predetermined algorithm.

7. The method of claim 1, further comprising:
receiving the building monitoring data from the plurality of environment monitoring sensors associated with a plurality of different sensor types.

8. The method of claim 1, the building environment comprising a first building environment, and the method further comprising:
receiving building monitoring data for a plurality of associated remote building environments comprising at least the first building environment; and
determining an overall building operational score for each of the plurality of associated remote building environments.

9. The method of claim 8, further comprising:
causing rendering of a user interface dashboard that identifies a preferred building environment of the plurality of remote building environments based on the overall building operational score for each of the plurality of remote building environments, a plurality of building operation score sets for each of the plurality of remote building environments, and/or a plurality of building operations financial score set of the plurality of remote building environments.

10. The method of claim 8, further comprising:
determining a portfolio overall building operational score for the plurality of associated remote building environments.

11. The method of claim 1, further comprising:
identifying a building environment type associated with the building environment; and
determining at least a building operations score of the building operations score set based on the building environment type and an environment regulatory threshold associated with the building environment type.

12. The method of claim 1, further comprising:
categorizing the overall building operational score with at least one other overall building operational score based on a geographic region associated with the building environment.

13. The method of claim 1, further comprising:
generating a metric weight set corresponding to the plurality of building operations metrics; and
determining the overall building operational score based on the metric weight set.

14. The method of claim 1, further comprising:
determining, based on a look-up table, a building environment type associated with the building environment based on the overall building operational score.

15. The method according to claim 1, the method further comprising:
determining, based at least in part on at least one sub-score associated with each building operations sub-metric, a target building operations sub-metric of the plurality of building operations sub-metrics determined to have a largest impact on improving the overall building operational score;
determining a notification action indicated to improve the target building operations sub-metric based at least in part on historical records associated with the target building operations sub-metric; and
presenting notification action information associated with the notification action to at least one client device.

16. The method of claim 1, the method further comprising:
determining at least one first sub-score associated with at least one of the plurality of first building operations sub-metrics based at least on a first portion of the building monitoring data; and
determining at least one second sub-score associated with the plurality of second building operations sub-metrics based at least on: the first portion of the building monitoring data and a second portion of the building monitoring data.

17. A system comprising:
one or more processors;
a memory including computer program code stored thereon that, in execution with the one or more processors, is configured to:
receive, via a plurality of environment monitoring sensors positioned in a building environment, building monitoring data;
determine, for the building environment, based on the building monitoring data, an overall building operations score indicative of an operational performance of the building environment, wherein determining the overall building operations score comprises:
determining, based on the building monitoring data, a building operations score set for a plurality of building operations metrics, each building operations score of the building operations score set is indicative of a performance of at least one operation in the building represented by a corresponding building operations metric, and wherein the plurality of building operations metrics comprises: a people metric, a process metric, an assets metric, a connectivity metric, and an environment metric, and wherein each building operations metric is associated with a plurality of building operations sub-metrics applicable for the corresponding building operations metric, wherein determining the building operations score set comprises:
determining a first building operations score for a first building operations metric based on one or more first sub-scores associated with a plurality of first building operations sub-metrics; and
determining a second building operations score for a second building operations metric based on: the one or more first sub-scores associated with the plurality of first building operations sub-metrics and one or more second sub-scores associated with a plurality of second building operations sub-metrics.

18. The system of claim 17, wherein the processor is further configured to:
determine, based at least in part on at least one sub-score associated with each building operations sub-metric, a target building operations sub-metric of the plurality of building operations sub-metrics determined to have a largest impact on improving the overall building operational score, wherein a building operations metric is one of: the people metric, the process metric, the assets metric, the connectivity metric, or the environment metric, wherein the people metric is associated with wellness of occupants within the building environment, and wherein the process metric is associated with at least one process related to at least one building operation within the building environment, wherein the assets metric is associated with at least one asset within the building environment, wherein the connectivity metric is associated with security of flow of information within the building environment, and wherein the environment metric is associated with an impact of the building on environment;
determine a notification action indicated to improve the target building operations sub-metric based at least in part on historical records associated with the target building operations sub-metric; and
present notification action information associated with the notification action to at least one client device.

19. A non-transitory computer-readable storage medium comprising computer program code for execution by one or more processors of a device, the computer program code configured to, when executed by the one or more processors, cause the device to perform:
receiving, via a plurality of environment monitoring sensors positioned in a building environment, building monitoring data;
determining, for the building environment, based on the building monitoring data, an overall building operations score indicative of an operational performance of the building environment, wherein determining the overall building operations score comprises:
determining, based on the building monitoring data, a building operations score set for a plurality of building operations metrics, each building operations score of the building operations score set is indicative of a performance of at least one operation in the building represented by a corresponding building operations metric in the building monitoring data, and wherein the plurality of building operations metrics comprises: a people metric, a process metric, an assets metric, a connectivity metric, and an environment metric, and wherein each building operations metric is associated with a plurality of building operations sub-metrics applicable for the corresponding building operations metric, wherein determining the building operations score set comprises:
determining a first building operations score for a first building operations metric based on one or more first sub-scores associated with a plurality of first building operations sub-metrics; and
determining a second building operations score for a second building operations metric based on: the one or more first sub-scores associated with the plurality of first building operations sub-metrics and one or more second sub-scores associated with a plurality of second building operations sub-metrics.

20. The non-transitory computer-readable storage medium of claim 19, wherein the device is further configured to perform:
determining, based at least in part on at least one sub-score associated with each building operations sub-metric, a target building operations sub-metric of the plurality of building operations sub-metrics determined to have a largest impact on improving the overall building operational score, wherein a building operations metric is one of: the people metric, the process metric, the assets metric, the connectivity metric, or the environment metric, wherein the people metric is associated with wellness of occupants within the building environment, and wherein the process metric is associated with at least one process related to at least one building operation within the building environment, wherein the assets metric is associated with at least one asset within the building environment, wherein the connectivity metric is associated with security of flow of information within the building environment, and wherein the environment metric is associated with an impact of the building on environment;
determining a notification action indicated to improve the target building operations sub-metric based at least in part on historical records associated with the target building operations sub-metric; and
presenting notification action information associated with the notification action to at least one client device.

* * * * *